United States Patent

O'Neill et al.

[11] Patent Number: 6,024,455
[45] Date of Patent: *Feb. 15, 2000

[54] REFLECTIVE ARTICLE WITH CONCEALED RETROREFLECTIVE PATTERN

[75] Inventors: Mark O'Neill, New Brighton; Michael F. Weber, Shoreview; Olester Benson, Jr., Woodbury, all of Minn.; John A. Wheatley, Ascott, United Kingdom; James M. Jonza, Woodbury, Minn.; Gary B. Hanson, Hudson, Wis.

[73] Assignee: 3M Innovative Properties Company, St. Paul, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 09/006,292

[22] Filed: Jan. 13, 1998

[51] Int. Cl.[7] ................................ G02B 5/124
[52] U.S. Cl. ................ 359/530; 359/498; 359/529; 359/584; 359/590; 283/85; 283/87; 283/91
[58] Field of Search ..................... 359/494, 498, 359/529, 530, 584, 589, 590; 283/72, 85, 87, 91

[56] References Cited

U.S. PATENT DOCUMENTS

| | | | |
|---|---|---|---|
| 2,568,126 | 9/1951 | Keeley | 156/298 |
| 3,124,639 | 3/1964 | Kahn | 88/65 |
| 3,610,729 | 10/1971 | Rogers . | |
| 3,711,176 | 1/1973 | Alfrey, Jr. et al. . | |
| 3,801,183 | 4/1974 | Sevelin et al. . | |
| 3,860,036 | 1/1975 | Newman, Jr. | 138/45 |
| 4,099,838 | 7/1978 | Cook et al. . | |
| 4,175,775 | 11/1979 | Kruegle | 283/7 |
| 4,268,117 | 5/1981 | Sevelin . | |
| 4,368,979 | 1/1983 | Ruell | 356/71 |
| 4,446,305 | 5/1984 | Rogers et al. | 528/348 |
| 4,520,189 | 5/1985 | Rogers et al. | 528/331 |
| 4,521,588 | 6/1985 | Rogers et al. | 528/363 |
| 4,525,413 | 6/1985 | Rogers et al. | 428/212 |
| 4,544,836 | 10/1985 | Galvin et al. | 235/487 |

(List continued on next page.)

FOREIGN PATENT DOCUMENTS

| | | |
|---|---|---|
| 469732 | 2/1992 | European Pat. Off. . |
| 63-140589 | 10/1993 | Japan . |
| WO 95/27919 | 4/1995 | WIPO . |
| WO 95/17303 | 6/1995 | WIPO . |

(List continued on next page.)

OTHER PUBLICATIONS

Schrenk et al., Nanolayer polymeric optical films, Tappi Journal, pp. 169–174, Jun., 1992.

*Primary Examiner*—Cassandra Spyrou
*Assistant Examiner*—Darren E Schuberg
*Attorney, Agent, or Firm*—Stephen C. Jensen

[57] ABSTRACT

A reflective article has a multilayer film covering a patterned retroreflective layer. In one embodiment the patterned retroreflective layer includes a separate indicia layer covering a retroreflective substrate. The indicia are substantially hidden under normal viewing conditions but easily detectable under retroreflective lighting conditions. Various types of retroreflective layers are disclosed. The article can also include microstructured relief patterns which produce holographic images under ambient lighting but which disappear under retroreflective conditions. The multilayer film includes alternating layers of at least a first and second polymer, and has a relatively high reflectivity for normally incident light within a first spectral range which is approximately coextensive with the visible spectrum, and a relatively low reflectance for normally incident light within a second spectral range. The second spectral range can include a transmission window of 15% or less fractional bandwidth located at least partially in the visible spectrum. Film constructions are disclosed which achieve sharper spectral transitions than previously attainable. Film constructions are also disclosed which preserve such sharp transitions even at high entrance (tilt) angles.

37 Claims, 14 Drawing Sheets

U.S. PATENT DOCUMENTS

| | | | |
|---|---|---|---|
| 4,589,686 | 5/1986 | McGrew | 283/85 |
| 4,708,920 | 11/1987 | Orensteen et al. | 430/11 |
| 4,720,426 | 1/1988 | Englert et al. | 428/344 |
| 4,906,070 | 3/1990 | Cobb, Jr. | |
| 5,169,707 | 12/1992 | Faykish et al. | 428/195 |
| 5,188,760 | 2/1993 | Hikmet et al. | 252/299.01 |
| 5,200,851 | 4/1993 | Coderre et al. | 359/351 |
| 5,211,878 | 5/1993 | Reiffenrath et al. | 252/299.63 |
| 5,235,443 | 8/1993 | Barnik et al. | 359/37 |
| 5,269,995 | 12/1993 | Ramanathan et al. | 264/171 |
| 5,284,364 | 2/1994 | Jain | 283/87 |
| 5,294,657 | 3/1994 | Melendy et al. | 524/270 |
| 5,316,703 | 5/1994 | Schrenk | 264/1.3 |
| 5,319,478 | 6/1994 | Fijnfschilling et al. | 359/53 |
| 5,339,198 | 8/1994 | Wheatley et al. | 359/359 |
| 5,353,154 | 10/1994 | Lutz et al. | 359/582 |
| 5,389,324 | 2/1995 | Lewis et al. | 264/171 |
| 5,422,756 | 6/1995 | Weber | 359/487 |
| 5,448,404 | 9/1995 | Schrenk et al. | 359/584 |
| 5,486,935 | 1/1996 | Kalmanash | 359/37 |
| 5,486,949 | 1/1996 | Schrenk et al. | 359/498 |
| 5,559,634 | 9/1996 | Weber | 359/638 |
| 5,612,820 | 3/1997 | Schrenk et al. | 359/498 |
| 5,624,731 | 4/1997 | Desjardins | 428/143 |
| 5,629,055 | 5/1997 | Revol et al. | 428/1 |
| 5,656,360 | 8/1997 | Faykish et al. | 428/195 |
| 5,670,096 | 9/1997 | Lu | 264/11 |
| 5,684,633 | 11/1997 | Lutz et al. | 359/588 |
| 5,686,979 | 11/1997 | Weber et al. | 349/96 |
| 5,699,188 | 12/1997 | Gilbert et al. | 359/584 |
| 5,721,603 | 2/1998 | De Vaan et al. | 349/194 |
| 5,742,411 | 4/1998 | Walters | 359/2 |
| 5,744,534 | 4/1998 | Ishiharada et al. | 524/442 |
| 5,751,388 | 5/1998 | Larson | 349/96 |
| 5,754,337 | 5/1998 | Burns et al. | 359/584 |
| 5,767,935 | 6/1998 | Ueda et al. | 349/112 |
| 5,770,306 | 6/1998 | Suzuki et al. | 428/328 |
| 5,783,120 | 7/1998 | Ouderkirk et al. | 264/134 |
| 5,793,456 | 8/1998 | Broer et al. | 349/98 |
| 5,808,794 | 9/1998 | Weber et al. | 359/487 |
| 5,825,542 | 10/1998 | Cobb, Jr. et al. | 359/487 |
| 5,825,543 | 10/1998 | Ouderkirk et al. | 359/494 |
| 5,840,405 | 11/1998 | Shusta et al. | 359/529 |

FOREIGN PATENT DOCUMENTS

| | | |
|---|---|---|
| WO 95/17691 | 6/1995 | WIPO |
| WO 95/17692 | 6/1995 | WIPO |
| WO 95/17699 | 6/1995 | WIPO |
| WO 96/19347 | 12/1995 | WIPO |
| 96/17263 | 6/1996 | WIPO |
| WO 96/41462 | 12/1996 | WIPO |
| WO 97/01440 | 1/1997 | WIPO |
| WO 97/01774 | 1/1997 | WIPO |
| WO 97/19820 | 6/1997 | WIPO |
| WO 97/32226 | 9/1997 | WIPO |
| WO 97/41462 | 11/1997 | WIPO |
| WO 97/41465 | 11/1997 | WIPO |
| WO 98/01779 | 1/1998 | WIPO |

REFLECTIVE ARTICLE WITH CONCEALED RETROREFLECTIVE PATTERN

CROSS REFERENCE TO RELATED APPLICATIONS

This application relates to the following U.S. patent applications, filed on even date herewith, assigned to the same assignee as the present application, and incorporated herein by reference: "Optical Film With Sharpened Bandedge", application Ser. No. 09/006,085; "Color Shifting Film", application Ser. No. 09/006,591; "Process For Making Multilayer Optical Film", application Ser. No. 09/006,288; "Retroreflective Dichroic Reflector", application Ser. No. 09/006,579.

BACKGROUND

The present invention relates generally to reflective articles having information-bearing indicia thereon. The invention has particular application to such articles which are polymeric.

The term "retroreflective" as used herein refers to the attribute of reflecting an obliquely incident light ray in a direction antiparallel to its incident direction, or nearly so, such that it returns to the light source or the immediate vicinity thereof. The term "patterned" when used in connection with the term "retroreflective" refers to an information-conveying design or image, and is to be distinguished from patterns such as simple seal cell polygonal shapes which do not convey significant information. Other terms are defined in the glossary at the end of the specification.

PCT Publication No. WO 95/17692 (Ouderkirk et al.), incorporated herein by reference, discloses multilayer polymeric films configured as reflective polarizers in combination with various structured surface materials which confine light to a relatively narrow viewing zone. Multilayer films having birefringent layers are discussed, including films where the out-of-plane refractive indices of adjacent layers are matched. Structured surface materials include those having a plurality of triangular prisms as well as symmetric cube corner sheeting. A discussion of the multilayer films configured as mirrors is also included.

It is known from U.S. Pat. No. 5,353,154 (Lutz et al.) to print indicia on at least one surface of a reflective polymeric body to illuminate information upon exposure to a back light source and to conceal such information when not exposed to light. The reflective polymeric body is provided with a first and second diverse polymeric material arranged in substantially parallel alternating layers, and a sufficient number of layers is provided such that the body reflects at least 40% of light impinging on a first major surface thereof while transmitting at least 5% of light directed through a second major surface thereof.

It is known from U.S. Pat. No. 4,175,775 (Kruegle) to provide a photo I.D. card with a photographic image hidden behind a filter region and placed in front of a high gain retroreflective material. The filter region absorbs virtually all of the light impinging on it, and may comprise a half-silvered mirror but "advantageously comprises" a filter material which transmits infrared or ultraviolet light but blocks substantially all visible light.

Retroreflective sheeting with printed indicia thereon, such as the ubiquitous traffic control "STOP" sign, is also known, as is retroreflective sheeting with directional images formed therein (see, e.g., U.S. Pat. No. 4,708,920 (Orensteen et al.)).

Two known types of retroreflective sheeting are microsphere-based sheeting and cube corner sheeting. Microsphere-based sheeting, sometimes called "beaded" sheeting, employs a multitude of microspheres typically at least partially imbedded in a binder layer and having associated specular or diffuse reflecting materials (e.g., pigment particles, metal flakes, vapor coats) to retroreflect incident light. Illustrative examples are disclosed in U.S. Pat. Nos. 3,190,178 (McKenzie), 4,025,159 (McGrath), and 5,066,098 (Kult). Cube corner retroreflective sheeting comprises a body portion typically having a substantially planar front surface and a structured rear surface comprising a plurality of cube corner elements. Each cube corner element comprises three approximately mutually perpendicular optical faces. Examples include U.S. Pat. Nos. 1,591,572 (Stimson), 4,588,258 (Hoopman), 4,775,219 (Appledorn et al.), 5,138,488 (Szczech), and 5,557,836 (Smith et al.). It is known to apply a seal layer to the structured surface in a regular pattern of closed polygons which form isolated, sealed cells to keep contaminants away from individual cube corners. Heat and pressure used to form the cells destroys or deforms cube corner elements located along the polygon boundaries. Flexible cube corner sheetings such as those disclosed in U.S. Pat. No. 5,450,235 (Smith et al.) are also known and can be incorporated in embodiments described below.

There is a continuing need for novel polymeric-based articles which can selectively display information. Such articles can be incorporated in a variety of end use applications such as document authentication, toys, games, and decorative articles.

BRIEF SUMMARY

Disclosed herein is a reflective article which has a multilayer film covering a patterned retroreflective layer. The multilayer film preferably includes alternating layers of at least a first and second polymer, the alternating layers being configured to exhibit a relatively high reflectance for normally incident light within a first spectral range and a relatively low reflectance for normally incident light within a second spectral range. In one embodiment, the first spectral range is approximately coextensive with the visible spectrum, and the second spectral range includes a transmission window of 15% or less fractional bandwidth. Multilayer polymeric film constructions are disclosed which achieve sharper spectral transitions than previously attainable. Such multilayer polymeric film constructions are also preferably configured to preserve such sharp transitions even at high entrance (tilt) angles. Microstructured relief patterns can be incorporated in a skin layer of the multilayer film or in an overlayer to additionally provide holographic images viewable in ambient light but not retroreflected light.

The patterned retroreflective layer can include a separate (optional) indicia layer covering a retroreflective substrate. In one embodiment, the indicia layer includes portions that preferentially transmit selected wavelengths of light. This embodiment can utilize either a narrowband or a wideband transmission window for the second spectral range.

The patterned retroreflective layer can exhibit retroreflectance in all planes of incidence and/or in at least one plane of incidence but not in at least one other plane of incidence. The patterned retroreflective layer can include a structured surface that has first and second distinguishable adjacent zones which define a pattern, where the first zone includes a plurality of retroreflective elements. The second zone can be unstructured, having no retroreflective elements thereon, or can be structured to include retroreflective elements different from the retroreflective elements in the first zone. In one embodiment, the first zone includes a regular array of standard microreplicated cube corner elements and the second zone includes an array of cube corner elements randomly tilted with respect to each other to produce a glittering effect.

Figure 1:
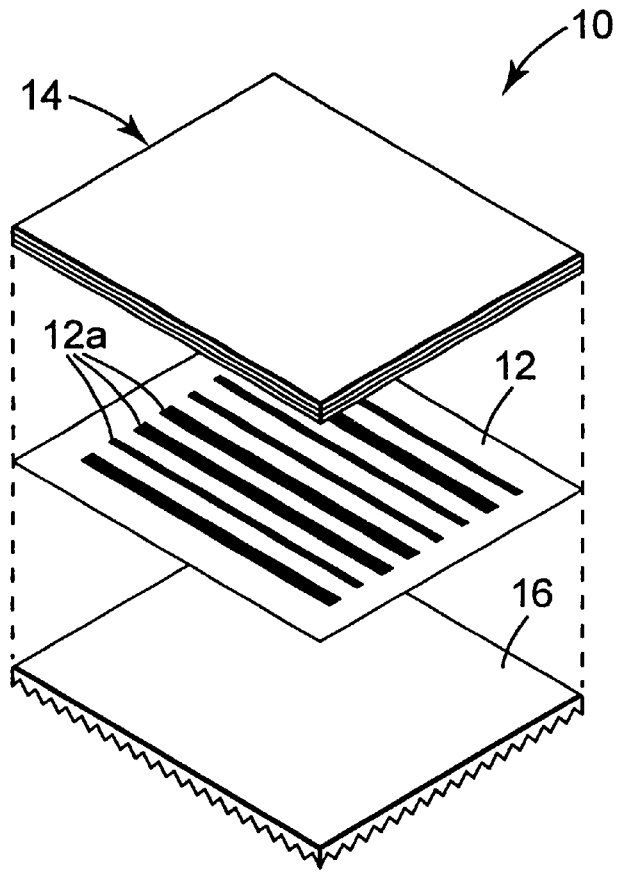
FIG. 1 is an exploded view of a reflective article with a concealed retroreflective pattern.

In the drawings, the same reference symbol is used for convenience to indicate elements which are the same or which perform the same or a similar function.

DETAILED DESCRIPTION OF THE ILLUSTRATIVE EMBODIMENTS

The articles described herein are ordinarily configured as sheetings which can be applied to a given object or substrate and which incorporate various combinations of a multilayer films and patterned retroreflective layers. The articles are generally single-sided optically. That is, one side (designated the front side) is generally adapted to both receive incident light from a source and emit reflected or retroreflected light toward a detector (such as the eye of an observer), and the other side (designated the rear side) is generally adapted for application to an object such as by an adhesive layer. The front side faces the light source as well as the detector. The articles do not generally transmit significant amounts of light from the front side to the rear side, or vice versa, due at least in part to the presence of a substance or layer on the retroreflector such as a vapor coat of metal, a seal film, and/or an adhesion layer. The particular type of multilayer film and patterned retroreflector employed make the article more suitable for certain end-use applications than for others. Only some end uses are discussed below. The text that follows begins with a discussion of the overall article configuration, followed by an in-depth discussion of preferred polymeric multilayer films, example articles, and ends with a glossary.

Illustrative Article Configurations

FIG. 1 is an exploded view of an article 10 having an information-containing indicia layer 12 sandwiched between a top reflective layer 14 and a bottom retroreflective layer 16. Indicia layer 12 is shown bearing a bar code, but it can also contain printed alphanumeric data, line drawings, half-tone images, and any other information-conveying pattern. The pattern is defined by opaque patterned regions 12a in an otherwise transparent layer, or vice versa. Such opaque regions can comprise known pigments such as inks. The regions can alternately comprise areas which diffusely reflect or otherwise scatter light rather than absorb light, or known dyes that absorb at some wavelengths and transmit at other wavelengths. It is desired, however, to conceal or at least obscure such pattern except under certain viewing conditions. Reflective layer 14 is provided for that purpose. Furthermore, the upper surface of layer 12 which faces layer 14 is preferably substantially smooth so that the patterned regions 12a of layer 12 do not give rise to corresponding disturbances in the surface of layer 14 which would then be readily apparent. "Substantially smooth" in this context means that surface variations in layer 12 are small compared to the thickness of layer 14. Patterned regions 12a are thus preferably flush with neighboring regions of indicia layer 12. This condition can be dispensed with if a separate layer of a suitable clear adhesive is used between layers 12 and 14, where such adhesive layer is thick enough to fill in surface variations in layer 12 and present a substantially smooth surface to layer 14.

Indicia layer 12 can include a distinct layer which is laminated or otherwise bonded to adjacent layers 14 and 16. Layer 12 can alternatively or in addition include a film of ink or other suitable pigment applied to layer 14 or 16 by known printing techniques.

Figure 2A:
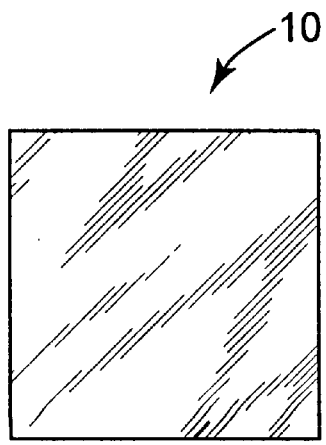
FIGS. 2A and 2B are front views of the article of FIG. 1 under different viewing conditions.
Figure 2B:
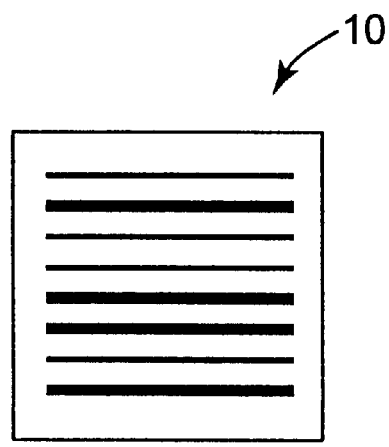

Layer 14 comprises a multilayer polymeric film having a percent reflectance and transmission which are substantially complementary (i.e., absorption is preferably low or negligible) for wavelengths of interest, and which are functions of the refractive indices and thicknesses of the constituent polymeric layers, as well as of the orientation and polarization of incident light. In a preferred embodiment layer 14 has a high reflectance throughout most of the visible spectrum for normally incident light so that in ambient lighting conditions the front surface of article 10 has a shiny mirror-like appearance as depicted in FIG. 2A. By "high reflectance throughout most of the visible spectrum" we mean a reflectance greater than 50%, and preferably greater than about 80%, over at least about 75% of the spectral range from about 400 to about 700 nm. Layer 14 also preferably has a narrow spectral band of relatively high transmission (and relatively low reflectance) so that for light within such narrow band the information-bearing pattern is detectable through the front surface of the article as depicted in FIG. 2B, at least for certain viewing geometries. A preferred layer 14 will have maximum in-band transmission for greater visibility of the pattern, while keeping the spectral width of the band as narrow as possible so that the pattern is not readily noticeable amidst ambient reflections. Preferred layers 14 are discussed in more detail below. In alternative non-preferred embodiments, layer 14 can be a conventional non-polymeric interference filter comprising inorganic alternating layers deposited on a substrate using vacuum deposition techniques. However such inorganic filters are expensive and often of limited surface area. They also tend to have poor adhesion to polymeric surfaces. Further, such inorganic filters are generally not capable of maintaining a sharp spectral transition over a wide range of entrance angles, as explained below.

Retroreflective layer 16 makes detection of the concealed pattern possible only at selected observation positions relative to a source of incident light. Where layer 16 comprises conventional cube corner or beaded retroreflective sheeting, detection of the pattern is best at small observation angles, i.e. for a detector positioned close to the light source. Furthermore, such sheeting supports retroreflection over a wide range of entrance angles and orientation angles, so that the angular orientation of article 10 with respect to an interrogating light source is not critical. It should be noted that the multilayer film 14 exhibits a spectral shift in percent reflectance and transmission as a function of entrance angle of incident light, and that the percent reflectance and transmission are functions of polarization for obliquely incident light. "S-" and "p-" polarization states refer to light having an electric field vector normal to and disposed in, respectively, the entrance plane. Unpolarized light is half p-polarized and half s-polarized. As described below, the multilayer film retains sharp spectral transition features for p-polarized light over the wide range of entrance angles supported by the retroreflective sheeting.

Figure 3:
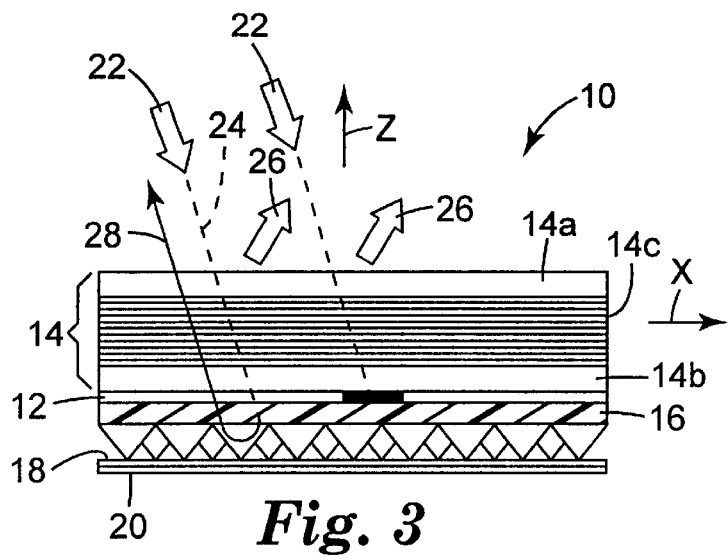
FIG. 3 is a side sectional view of a reflective article with a concealed retroreflective pattern.

In FIG. 3 a sectional view of the article 10, slightly modified from FIG. 1, is shown. Reflective layer 14 is shown with a front and rear skin layer 14a,14b, respectively, which serve to protect the central multilayer film 14c and which provide mechanical support for film 14c. A conventional seal film 18 is provided at the back side of the retroreflective layer 16 to protect the retroreflective elements from degradation caused by moisture, dirt, oils, and the like, and a conventional adhesive layer 20 comprising a pressure sensitive adhesive is applied to the backside therof to permit the article 10 to be applied to a desired object. A release liner (not shown) can also be included to protect the adhesive layer until the article is ready to be applied to a substrate. Seal film 18 can be sealed against layer 16 in a conventional polygonal pattern using a hot press technique which destroys cube corner elements along the periphery of such polygons. The faces of the structured rear surface of layer 16 can contact air and operate on the principles of total internal reflection (TIR) or, if desired, a vapor coat of specularly reflective material such as aluminum can be applied to such faces. Seal films, adhesive layers, and vapor coats can similarly be used with the embodiments shown in FIGS. 4A–D, 6, and 7A–B below.

Cartesian coordinates X,Z are shown in FIG. 3; a Y-axis (not shown) perpendicular to the X- and Z-axes points into the page. The X-Y plane defines the plane of the article 10 and the Z-axis is normal to the article. As shown, broadband light 22 is incident along an illumination axis 24 at a small but non-zero entrance angle with respect to the Z-axis. The entrance angle is small enough that the behavior of s- and p-polarized light is not significantly different. Multilayer film 14c reflects most of the visible portions of light 22 into specularly reflected light components 26. Specularly reflected light 26 is directed along a reflection axis that makes the same angle with the Z-axis as does axis 24. Some of the incident light is transmitted by film 14c, and the portion that is transmitted by the indicia layer 12 is retroreflected by layer 16, as indicated by the retroreflected light component 28. The pattern printed on indicia layer 12 is thus not ordinarily visible in ambient lighting conditions, but becomes visible if the observer is positioned sufficiently close to a directed light source such that retroreflected light is apparent. Where the article 10 is applied to clothing it will exhibit a shiny mirror-like finish in daylight but will reveal the underlying pattern, which may for example be a manufacturer's logo or a waning message, to vehicle drivers at night.

Figure 4A:
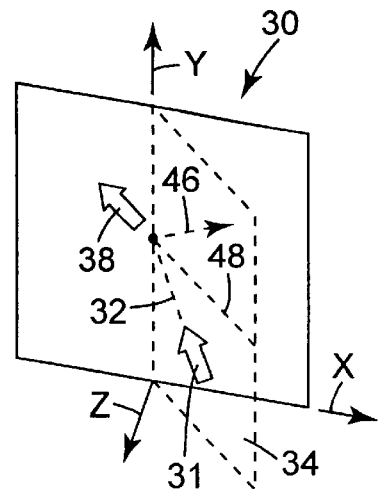
FIG. 4A is a perspective front view of a combined reflective/retroreflective article which exhibits retroreflectance in some planes of incidence and not others.
Figure 4B:
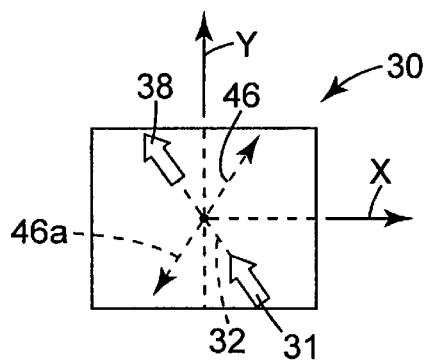
FIG. 4B is a front plan view thereof.
Figure 4C:
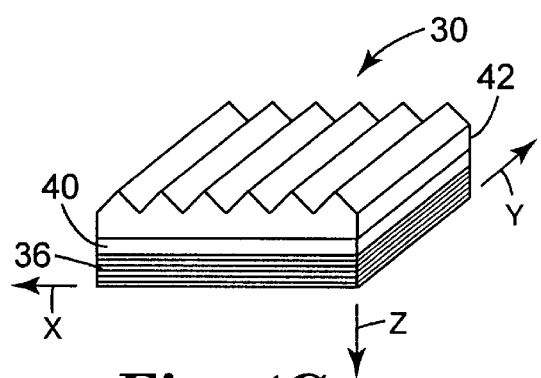
FIGS. 4C and 4D are perspective rear views showing different structured surfaces capable of exhibiting the behavior depicted in FIGS. 4A and 4B.
Figure 4D:
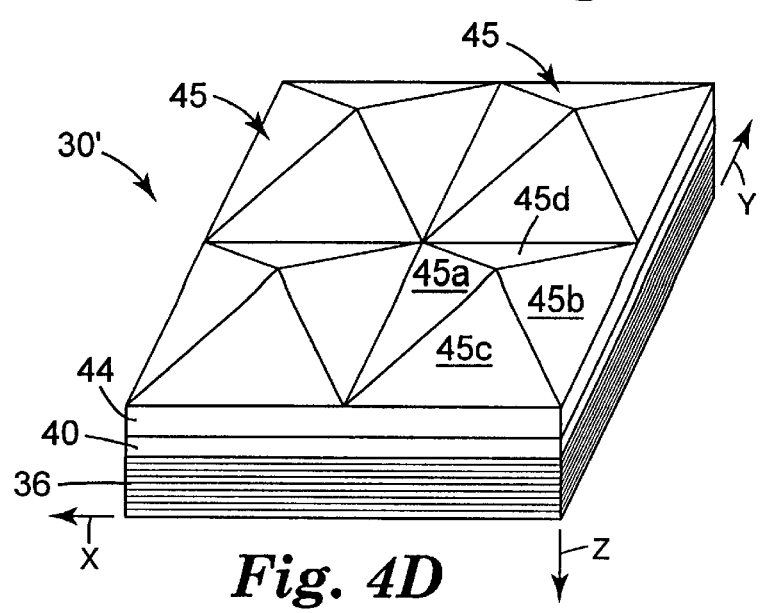

Turning now to FIGS. 4A and 4B, an article 30 similar to article 10, but having distinctive properties due to the use of a different retroreflective layer, is shown schematically in the context of a Cartesian XYZ coordinate system having the X- and Y-axes in the plane of the article and the Z-axis normal to the article. The X- and Y-axes are aligned such that the X-Z plane and the Y-Z plane are planes of symmetry for the rear structured surface of the retroreflective layer. The retroreflective layer of FIGS. 4A and 4B makes viewing of the information-containing pattern more complicated because the observation angle at which the patterned light component is visible changes as a function of both entrance angle and orientation angle of the incident light.

Incident light 31 is directed along an illumination axis 32 which defines an entrance angle (the angle between axis 32 and the Z-axis) and an orientation angle (the angle between the Y-axis and the projection of axis 32 in the X-Y plane). A plane 34, not to be confused with the entrance half-plane (not shown), contains axis 32 and the Y-axis. A multilayer film 36 (see FIGS. 4C,4D) reflects most of the visible light components of incident light 31 into a specularly reflected light component 38. The directions of incident light 31 and specularly reflected light 38 make equal angles with the surface normal, i.e., with the Z-axis. Certain spectral components of the incident light 31 are transmitted by multilayer film 36 to an indicia layer 40 similar to layer 12 discussed above. Light transmitted through the indicia layer is reflected by a rear retroreflecting layer (42 in FIG. 4C; 44 in FIG. 4D) and transmitted back through indicia layer 40 and multilayer film 36 as a second reflected light beam 46. Reflected light 46 carries the patterned information contained in indicia layer 40 whereas specularly reflected light 38 does not. Like the embodiment of FIG. 3, the reflected light carrying the patterned information is angularly displaced from the specularly reflected light. However, unlike the embodiment of FIG. 3—which utilizes fully retroreflective cube corner elements—the reflected light 46 in FIGS. 4A–B is not necessarily retroreflected in a direction antiparallel to incident light 31. Instead, reflected light 46 can be angularly displaced from the incident light direction depending upon the orientation (entrance angle and orientation angle) of the incident light direction with respect to the article 30. Such angular displacement permits a simplified design of a readout device to detect the patterned information, since the interrogating light source can be spatially separated from the retroreflected light detector. Referring to FIG. 4A, the direction of reflected light 46 and incident light 31 make equal angles with respect to a line segment 48. Line segment 48 is defined by the intersection of a retroreflecting plane associated with the retroreflecting layer (in this instance, a plane parallel to the X-Z plane) with the plane 34.

Retroreflecting layer 42 has only one associated retroreflecting plane—the X-Z plane—while the layer 44 has two retroreflecting planes—the X-Z plane and the Y-Z plane. In this context, the "X-Z" plane and the "Y-Z" plane include the family of all planes parallel thereto which intersect the article. The layer 42 comprises a structured surface having a linear array of miniature substantially right-angled isosceles prisms arranged side-by-side and extending parallel to the Y-axis, substantially as described in U.S. Pat. No. 4,906,070 (Cobb, Jr.). Light which is obliquely incident upon the smooth front surface of the layer opposite the structured surface is retroreflected if the direction of incidence lies in a plane (the X-Z plane) perpendicular to the length of the prisms. The layer 44 comprises a structured surface having an array of pyramid-like structures 45 extending out of the layer 44, each structure 45 having a first set of mutually perpendicular reflective facets 45a,45b which define the X-Z plane of retroreflection and a second set of mutually perpendicular reflective facets 45c,45d which define the Y-Z plane of retroreflection, substantially as described in U.S. patent Ser. No. 08/883,870 entitled "Dual Axis Retroreflective Article". It should be noted that layer 44 can in general produce a second patterned reflected light component 46a (see FIG. 4B) due to reflection from facets 45c,45d in addition to reflected light component 46, which arises due to reflection from facets 45a,45b. The structured surface of layer 44 can also include standard cube corner elements such that the article exhibits both dual axis retroreflection and full (three axis) retroreflection.

The cube corner elements, prisms, and pyramids on the structured surface of retroreflective layers 16, 42, and 44 respectively are preferably miniature structures formed using known microreplication techniques. The reflective/retroreflective articles discussed above are preferably thin and flexible to permit application to a variety of object or surface shapes, although rigid or otherwise thick constructions may be desirable for some applications. The individual structures in the structured surface preferably have a vertical and lateral extent of no more than about 1 mm, and more preferably in the range of about 0.075 to 0.2 mm, although the linear prisms can extend along the entire length of the article which may be on the order of millimeters, centimeters, or meters. The retroreflective layers can be made from any suitable transparent materials, preferably polymers and preferably materials that are dimensionally stable, durable, weatherable, and easily replicated in the desired configuration. Examples include acrylics, polycarbonates, polyethylene-based ionomers, and cellulose acetate butyrates. Dyes, coloring agents, and pigments can also be incorporated into such layers.

Figure 5:
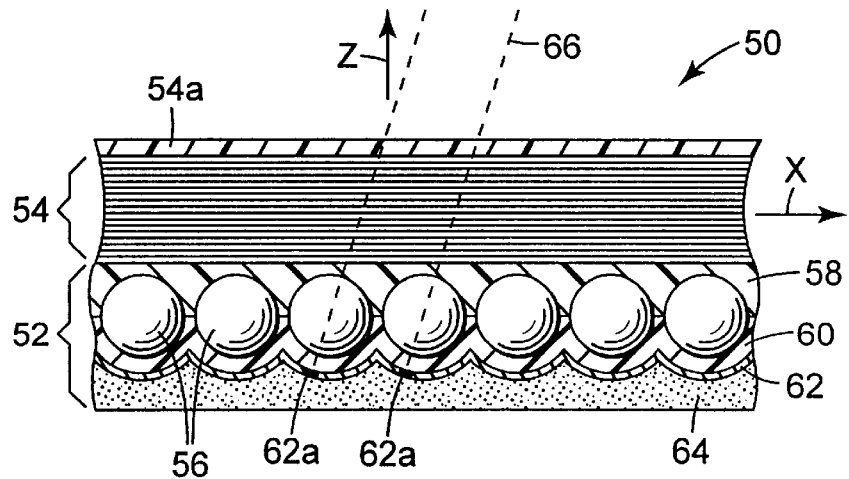
FIG. 5 is a side sectional view of a combined reflective/retroreflective article which incorporates beaded retroreflective sheeting having a directional image.

The reflective/retroreflective article 50 introduced in FIG. 5 uses a beaded retroreflective sheeting layer 52 as described in U.S. Pat. No. 4,708,920 (Orensteen et al.) together with a multilayer film 54. Film 54 has the same reflectance and transmission properties as multilayer films 14 and 36 discussed above. Multilayer film 54 is provided with a protective skin layer 54a on the front surface thereof. Retroreflective layer 52 has a multitude of transparent microspheres 56 held between a transparent overcoat layer 58 and a transparent spacer layer 60. Light impinging from a given direction on the overcoat layer is focused by the microspheres onto small areas of a reflective masking layer 62, which is typically a specularly reflective metallic coating such as aluminum, and reflected back through the microspheres in the opposite direction. An adhesive layer 64 abuts masking layer 62. Markings 62a are disposed at selected positions on masking layer 62 corresponding to light incident on article 50 along an illumination axis 66 having a specific entrance angle and orientation angle. Markings 62a are regions of altered reflectivity relative to neighboring regions of layer 62, and produce a noticeable change in retroreflected light in the vicinity of the specified illumination direction. Multilayer film 54 makes viewing of the pattern formed by markings 62a even more difficult by imparting a shiny mirror-like appearance to the article 50 and by restricting the retroreflected light to a narrow spectral band. In order to detect the pattern formed by markings 62a, one approaching the shiny article 50 would have to both (1) orient a light source at the specified entrance angle and at the specified orientation angle, the light source emitting light in the passband of the film 54 for the specified orientation, and (2) position a detector in the vicinity of the light source to observe the narrowband retroreflected light. Additional patterns independent of the pattern formed by markings 62a can be provided using additional sets of markings on the masking layer 62, each such additional set consisting essentially of markings positioned on layer 62 to correspond with an illumination direction different from axis 66. The entrance angles associated with each set of markings and the spectral properties of film 54 determine the wavelengths at which the respective images can be detected.

Other known image-bearing retroreflective sheetings can be substituted for layer 52, e.g., those disclosed in U.S. Pat. No. 3,801,183 (Sevelin et al.).

Figure 6:
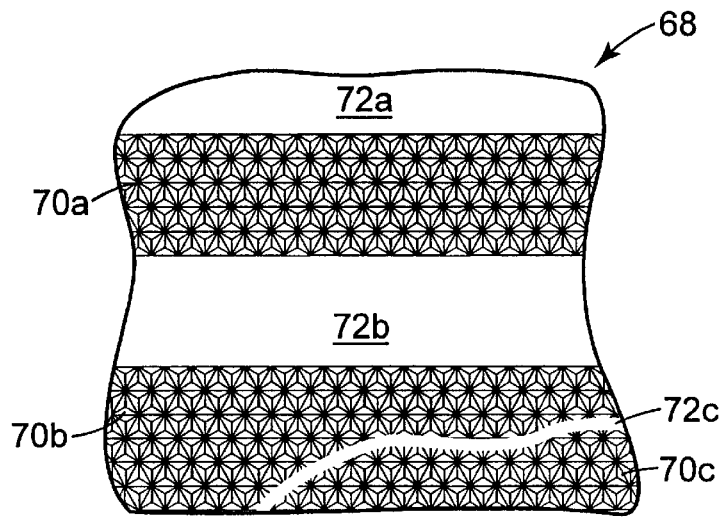
FIG. 6 is a rear plan view of a structured surface of retroreflective elements incorporating patterns therein.

Article 50 incorporates the information-bearing pattern in the retroreflective layer 52 rather than in a separate indicia layer 12 as shown in FIGS. 1, 3, 4C, and 4D, resulting in a thinner end product compared with one having a separate indicia layer. The embodiment of FIG. 6 also dispenses with a separate indicia layer. FIG. 6 depicts a structured surface 68 of a retroreflective layer which can be substituted for any of the previously discussed structured surface retroreflective layers. Patterns are defined in the structured surface by zones 70a,70b,70c containing retroreflecting elements and zones 72a,72b,72c which are devoid of retroreflecting elements. Retroreflecting elements either were never formed on zones 72a,72b,72c, as where the mold used to make the layer has smooth surfaces corresponding to those zones, or were formed and were thereafter obliterated or deformed selectively at those zones. Such selective deformation of retroreflective elements is to be distinguished from the known practice of destroying cube corner elements along closed polygonal boundaries during attachment of a seal layer to the structured surface, where the polygonal shapes do not convey significant information. Obliteration of retroreflective elements can be accomplished by any known means, for example by application of sufficient heat and/or pressure in the selected zones.

Other arrangements for providing a patterned retroreflective layer are also contemplated. For example, a patterned metallization layer or vapor coat can be provided on the structured surface similar to embodiments shown in U.S. patent Ser. No. 5,229,882 (Rowland). Likewise, other patterned coatings such as paint, inks, adhesives, etc. can be applied to the structured surface. Such coatings modify the retroreflective performance of zones to which they are applied. If the refractive index of the coating material is close enough to that of the retroreflective layer to eliminate TIR, such coating can effectively destroy retroreflectance without mechanically deforming the structured surface.

Figure 7A:
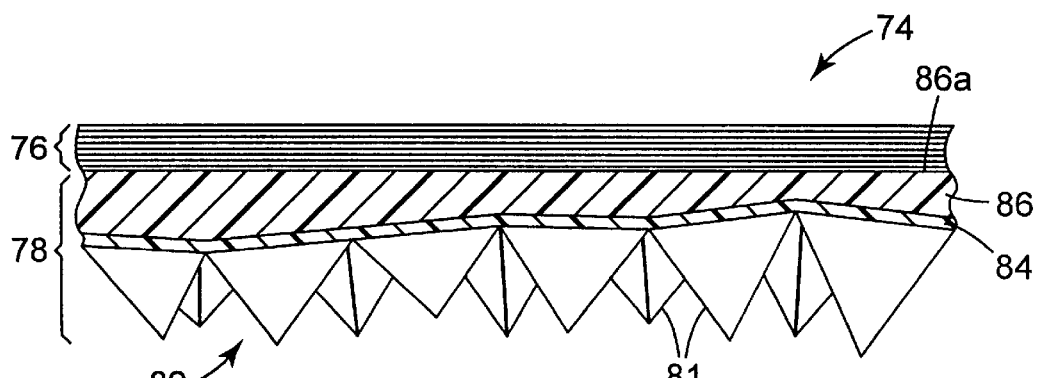
FIG. 7A is a side sectional view of a portion of a combined reflective/retroreflective article incorporating cube corner retroreflective sheeting having cube corner elements arranged to impart a glittering quality to the sheeting.
Figure 7B:
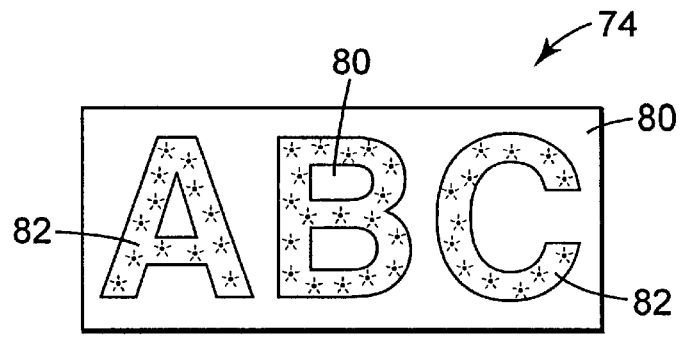
FIG. 7B is a view of such sheeting where glittering and non-glittering areas define a pattern.

FIGS. 7A and 7B depict another embodiment 74 where the information-containing pattern is provided by the retroreflecting layer itself so that a separate indicia layer can, if desired, be avoided. A multilayer film 76 having reflective and transmissive properties similar to previously described films 14, 36, and 54 is laminated to retroreflective layer 78. Layer 78 is described in detail in U.S. patent application Ser. No. 08/640,326 entitled "Glittering Cube-Corner Retroreflective Sheeting" (Attorney Docket No. 52373USA3A), filed Apr. 30, 1996 and assigned to the same assignee as the present application. Basically, retroreflective layer 78 comprises zones 80 where cube corner elements 81 are arranged in a predetermined repeating pattern as well as zones 82, shown in FIG. 7A, where such cube corner elements are randomly tilted across the array. The random tilting of cube corner elements in zones 82 imparts a glittering quality to layer 78 which is not present in zones 80, thereby providing a basis upon which a pattern can be distinguished. The appearance of article 74 in retroreflected light shown in FIG. 7B reveals the glittering pattern "ABC". Alternatively, glittering and non-glittering zones can be exchanged so that the pattern consists of non-glittering retroreflective characters on a glittering retroreflective background. Turning again to FIG. 7A, retroreflective layer 78 is seen to comprise a cube corner layer, which includes cube corners 81 and an optional land layer 84, and a body layer 86 having a substantially flat front surface 86a and a rear surface which is not uniformly spaced from the front surface in zone 82.

The main component layers of the reflective/retroreflective article can be combined in a variety of ways. For example, an indicia layer can be combined with neighboring layers by printing techniques or by lamination. Lamination of one layer to another can include application of a tie layer of suitable thickness and composition for optimal bonding. Cast-and-cure techniques can also be used, such as those described in U.S. Pat. No. 5,175,030 (Lu et al.). For example, cube corner or prismatic retroreflective elements can be formed on a sheet of preexisting multilayer film by applying a resin to the film, casting the resin in the form of the retroreflective elements, and curing the resin using ultraviolet light, heat, or other suitable agents.

Multilayer Polymeric Film Design

Figure 8:
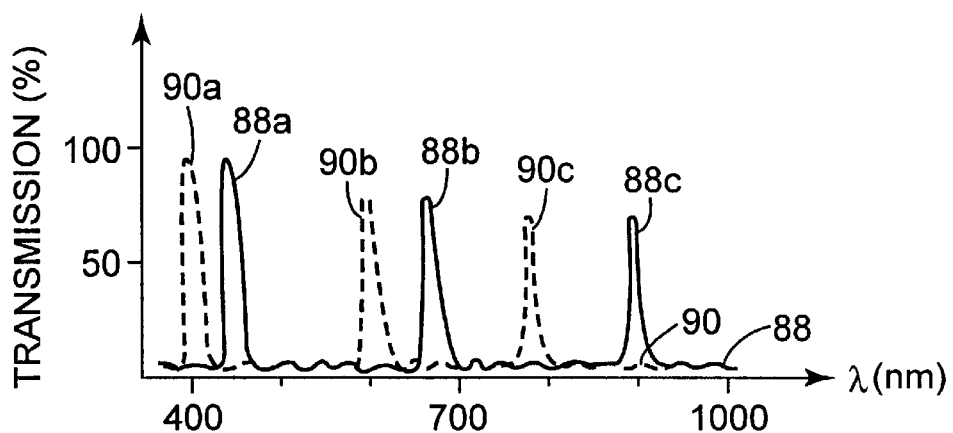
FIG. 8 shows idealized percent transmission spectra of a multilayer polymeric film useable in the invention.

FIG. 8 shows a possible idealized percent transmission spectrum for multilayer films 14, 36, 54, and 76. A solid-line curve 88 represents behavior for light (whether polarized or not) incident normally on the film and broken-line curve 90 represents behavior only for the p-polarized component of light incident at a nonzero entrance angle such as 30 to 40 degrees. The transmission spectrum for s-polarized light at the nonzero entrance angle is not shown to avoid confusion. Entrance angle is referenced to an air medium. Over the wavelength range of interest the absorption of the component layers of the film is small enough so that from a practical standpoint reflectance≈100%—transmission over such wavelength range.

Advantageously, the multilayer film is configured to exhibit at least one narrow transmission band 88a, 88b, 88c. Although transmission bands 88a,88b,88c are shown with transmission maxima greater than 50%, films with maxima between about 10% and 50% may also provide enough return light for detection and will exhibit less "color" in the reflectivity spectrum, which is beneficial where a high gloss mirror-type ambient appearance is desired. A narrow bandwidth high peak transmission characteristic is preferred over a broadband low-level transmission characteristic since the former is substantially more efficient in a double-pass arrangement by a ratio of the square of the respective peak transmission values. Fractional bandwidths on the order of 15% or less are preferred, and more preferably on the order of 10% or less. Polymeric film constructions having thickness gradients effective to produce sharper cut-on and cut-off transitions than previously attainable in polymeric films are described below.

The film associated with the spectra of FIG. 8 has, at normal incidence, two transmission bands in the visible and one in the near infrared. Alternative films useable in a combined reflective/retroreflective article as disclosed herein can have a different number and placement of transmission bands. A film with a transmission band in the visible for at least some entrance angles enables visual detection of the underlying pattern by the unaided human eye. A film having a single band at slightly greater than 400 nm at normal incidence produces a vivid blue retroreflected beam for head-on viewing and then, as the article is tilted and the band "blue-shifts" (i.e., shifts to shorter wavelengths) into the ultraviolet region, the article appears like an ordinary mirror since the retroreflected ultraviolet light is not detectable by the eye. A film having a single band towards the red end of the visible spectrum at normal incidence produces a vivid red retroreflected beam for head-on viewing and as the article is tilted the patterned retroreflected beam shifts to the yellow and green portion of the spectrum. A film having a single band at slightly greater than 700 nm (up to about 800 nm) at normal incidence appears like an ordinary mirror for head-on viewing but reveals the underlying pattern in vivid shades of red at higher angles of incidence. Finally, a film having a single band located well into the near infrared (or, even slightly disposed in the ultraviolet) at zero entrance angle will appear like an ordinary mirror at all viewing angles. These last types of films provide maximum concealment of the underlying pattern. Of course, a detector which is sensitive to infrared or ultraviolet light as appropriate would be used to detect retroreflected light outside of the visible spectrum.

It is desirable in many applications that the multilayer film have a transmission band that does not significantly increase in fractional bandwidth nor decrease in amplitude as the entrance angle increases beyond zero degrees, for the portion of the incident light that is p-polarized. In FIG. 8 it can be seen that p-polarized transmission bands 90a,90b,90c are blue-shifted compared with the corresponding bands 88a–c respectively of curve 88 for normally incident light, and significantly the peak amplitudes and fractional bandwidths are substantially unchanged. Such preservation of peak amplitude and fractional bandwidth are due to a preservation of the shape of the two transitions on either side of the band peak making up the band, which in turn comes about when the multilayer film is composed of individual layers whose out-of-plane (i.e., Z-axis) indices of refraction are substantially matched. This construction can be realized where at least some of the layers are composed of a polymer whose in-plane refractive indices are functions of known post-extrusion stretching procedures. Previously available multilayer films, such as those made by vacuum deposition of isotropic inorganic layers, have the same index mismatch in the out-of-plane direction as the in-plane directions, and as a result they experience a detrimental decrease in peak amplitude and increase in fractional bandwidth for a given p-polarization transmission band as entrance angle is increased. This detrimental performance can be avoided to some degree by increasing the number of layers in the film, but only with an accompanying increase in complexity and cost. Furthermore, baseline or "out-of-band" p-polarization transmission levels for such nonideal films degrades (increases) substantially with increasing entrance angle, typically exceeding leakage levels of 30%.

The reflectance and transmission spectra of a particular multilayer film primarily depends on the optical thickness of the individual layers along the various axes, and is substantially determined by the well known Fresnel coefficients. Films can be designed to reflect infrared, visible, or ultraviolet light by choice of the appropriate optical thicknesses of the layers in accordance with the following formula:

$$\lambda_M = (2/M) \cdot D_r \qquad (I)$$

where M is an integer representing the particular order of the reflected light and $D_r$ is the optical thickness of an optical repeating unit ("ORU"). Accordingly, $D_r$ is the sum of the optical thicknesses of the individual layers that make up the ORU. By arranging the ORUs along the thickness of the multilayer film in a series such that the optical thicknesses of the ORUs conform to a give profile, a multilayer film can be designed that reflects light over a broad reflection band.

A reflecting multilayer film having the properties described herein can be made by employing a multilayer coextrusion device as described in U.S. Pat. Nos. 3,773,882 (Schrenk) and 3,884,606 (Schrenk). Such a device provides a method for preparing multilayered, simultaneously extruded thermoplastic materials, each layer of which has a substantially uniform layer thickness. The feedblock of the coextrusion device receives streams of the diverse thermoplastic polymeric materials from a source such as a heat plastifying extruder. The streams of resinous materials are passed to a mechanical manipulating section within the feedblock. This section serves to rearrange the original streams into a multilayered stream having the number of layers desired in the final body. Optionally, this multilayered stream can be subsequently passed through a series of layer multiplying means, such as described in U.S. Pat. Nos. 3,759,647 (Schrenk et al.), 5,094,788 (Schrenk et al.), or 5,094,793 (Schrenk et al.), in order to further increase the number of layers in the final film. The multilayered stream is then passed into an extrusion die which is so constructed and arranged (see, e.g., U.S. Pat. No. 3,557,265 (Chisholm et al.)) that streamlined flow is maintained therein. The resultant product is extruded to form a multilayered film in which each layer is generally parallel to the major surface of adjacent layers. The configuration of the extrusion die can vary and can be such as to reduce the thickness and dimensions of each of the layers. The number of layers in the reflective film body can be selected to achieve the desired optical properties using the minumum number of layers for reasons of film thickness, flexibility, and economy. In the case of mirrors and reflective polarizers, the number of layers is preferably less than about 10,000, more preferably less than about 5,000, and (even more preferably) less than about 2,000.

The desired relationship between refractive indices of polymeric layers can be achieved by selection of appropriate materials and appropriate processing conditions. In the case of organic polymers which can be oriented by stretching, the multilayer films are generally prepared by coextruding the individual polymers to form a multilayer film (as set forth above) and then "orienting" the reflective film body by stretching at a selected temperature, optionally followed by heat-setting at a selected temperature. Alternatively, the extrusion and orientation steps can be performed simultaneously. By the orientation, the desired extent of birefringence (positive or negative) is set in those polymeric layers that comprise a polymer that can exhibit birefringence. In the case of mirrors, the film can be stretched substantially in two directions (biaxial orientation) to produce a mirror film where any given individual layer has substantially the same in-plane refractive indices and at least some of such layers have an out-of-plane refractive index different from the in-plane indices (and therefore are birefringent). The mirror film body can be allowed to dimensionally relax in the cross-stretch direction from the natural reduction in cross-stretch (equal to the square root of the stretch ratio) to being constrained (i.e., no substantial change in cross-stretch dimensions). The film body can be stretched in the machine direction, as with a length orienter, and/or in width using a tenter. The pre-stretch temperature, stretch rate, stretch ratio, heat set temperature, heat set time, heat set relaxation, and cross-stretch relaxation are selected to yield a multilayer film having the desired refractive index relationship. These variables are interdependent: thus, for example, a relatively low stretch rate could be used if coupled with, e.g., a relatively low stretch temperature. It will be apparent to one of ordinary skill how to select the appropriate combination of these variables to achieve the desired multilayer device. In general, however, a stretch ratio in the range from about 1:2 to about 1:10 (more preferably about 1:3to about 1:7) in the stretch direction and from about 1:0.2 to about 1:10 (more preferably from about 1:0.2 to about 1:7) orthogonal to the stretch direction is preferred.

Orientation of the extruded film can be done by stretching individual sheets of the material in heated air. For economical production, stretching can be accomplished on a continuous basis in a standard length orienter, tenter oven, or both. Economies of scale and line speeds of standard polymer film production can be achieved thereby achieving manufacturing costs that are substantially lower than costs associated with commercially available absorptive polarizers. Lamination of two or more multi-layer films can also be practiced to obtain a mirror film. Amorphous copolyesters are useful as laminating materials, with VITEL Brand 3000 and 3300 from the Goodyear Tire and Rubber Co. of Akron, Ohio, noted as materials that have been tried. The choice of laminating material is broad, with adhesion to the multi-layer films, optical clarity and exclusion of air being the primary guiding principles. It may be desirable to add to one or more of the layers, one or more inorganic or organic adjuvants such as an antioxidant, extrusion aid, heat stabilizer, ultraviolet ray absorber, nucleator, surface projection forming agent, and the like in normal quantities so long as the addition does not substantially interfere with the desired performance.

One class of polymeric materials incorporated into the multilayer film preferably produce birefringent polymeric layers. These materials are characterized in that stretching in a given direction substantially alters one or more of its refractive indices, and a particularly preferred layer is one containing a crystalline or semi-crystalline polyethylene naphthalate (PEN) inclusive the isomers (e.g. 2,6-; 1,4-; 1,5-; 2,7; and 2,3-PEN). Another class of polymeric materials incorporated into the multilayer film preferably produce substantially isotropic polymeric layers. These materials are characterized in that stretching in a given direction has little or no effect on its refractive indices, and a particularly preferred layer is one containing a layer containing a polymethylmethacrylate and in particular polymethylmethacrylate itself.

Materials Selection For Multilayer Film

A variety of polymer materials suitable for use in the embodiments herein have been taught for use in making coextruded multilayer optical films. For example, in U.S. Pat. Nos. 4,937,134, 5,103,337, 5,448,404, 5,540,978, and 5,568,316 to Schrenk et al., and in 5,122,905, 5,122,906, and 5,126,880 to Wheatley and Schrenk. Of special interest are birefringent polymers such as those described in 5,486,949 and 5,612,820 to Schrenk et al, U.S. application Ser. No. 08/402,041 to Jonza et al, and U.S. application entitled "Modified Copolyesters and Improved Multilayer Reflective Films" filed on even date by applicants under Attorney Docket No. 53550USA6A, all of which are herein incorporated by reference. Regarding the preferred materials from which the films are to be made, there are several conditions which should be met to make the preferred multilayer optical films. First, these films should consist of at least two distinguishable polymers; the number is not limited, and three or more polymers may be advantageously used in particular films. Second, at least one of the two polymers, referred to as the "first polymer", should have a stress optical coefficient having a large absolute value. In other words, it should be capable of developing a large birefringence when stretched. Depending on the application, the birefringence may be developed between two orthogonal directions in the plane of the film, between one or more in-plane directions and the direction perpendicular to the film plane, or a combination of these. Third, the first polymer should be capable of maintaining birefringence after stretching, so that the desired optical properties are imparted to the finished film. Fourth, the other required polymer, referred to as the "second polymer", should be chosen so that in the finished film, its refractive index, in at least one direction, differs significantly from the index of refraction of the first polymer in the same direction. Because polymeric materials are typically dispersive, that is, the refractive indices vary with wavelength, these conditions must be considered in terms of a particular spectral bandwidth of interest.

Other aspects of polymer selection depend on specific applications. For polarizing films, it is advantageous for the difference in the index of refraction of the first and second polymers in one film-plane direction to differ significantly in the finished film, while the difference in the orthogonal film-plane index is minimized. If the first polymer has a large refractive index when isotropic, and is positively birefringent (that is, its refractive index increases in the direction of stretching), the second polymer will be chosen to have a matching refractive index, after processing, in the planar direction orthogonal to the stretching direction, and a refractive index in the direction of stretching which is as low as possible. Conversely, if the first polymer has a small refractive index when isotropic, and is negatively birefringent, the second polymer will be chosen to have a matching refractive index, after processing, in the planar direction orthogonal to the stretching direction, and a refractive index in the direction of stretching which is as high as possible.

Alternatively, it is possible to select a first polymer which is positively birefringent and has an intermediate or low refractive index when isotropic, or one which is negatively birefringent and has an intermediate or high refractive index when isotropic. In these cases, the second polymer may be chosen so that, after processing, its refractive index will match that of the first polymer in either the stretching direction or the planar direction orthogonal to stretching. Further, the second polymer will be chosen such that the difference in index of refraction in the remaining planar direction is maximized, regardless of whether this is best accomplished by a very low or very high index of refraction in that direction.

One means of achieving this combination of planar index matching in one direction and mismatching in the orthogonal direction is to select a first polymer which develops significant birefringence when stretched, and a second polymer which develops little or no birefringence when stretched, and to stretch the resulting film in only one planar direction. Alternatively, the second polymer may be selected from among those which develop birefringence in the sense opposite to that of the first polymer (negative—positive or positive—negative). Another alternative method is to select both first and second polymers which are capable of developing birefringence when stretched, but to stretch in two orthogonal planar directions, selecting process conditions, such as temperatures, stretch rates, post-stretch relaxation, and the like, which result in development of unequal levels of orientation in the two stretching directions for the first polymer, and levels of orientation for the second polymer such that one in-plane index is approximately matched to that of the first polymer, and the orthogonal in-plane index is significantly mismatched to that of the first polymer. For example, conditions may be chosen such that the first polymer has a biaxially oriented character in the finished film, while the second polymer has a predominantly uniaxially oriented character in the finished film.

The foregoing is meant to be exemplary, and it will be understood that combinations of these and other techniques may be employed to achieve the polarizing film goal of index mismatch in one in-plane direction and relative index matching in the orthogonal planar direction.

Different considerations apply to a reflective, or mirror, film. Provided that the film is not meant to have some polarizing properties as well, refractive index criteria apply equally to any direction in the film plane, so it is typical for the indices for any given layer in orthogonal in-plane directions to be equal or nearly so. It is advantageous, however, for the film-plane indices of the first polymer to differ as greatly as possible from the film-plane indices of the second polymer. For this reason, if the first polymer has a high index of refraction when isotropic, it is advantageous that it also be positively birefringent. Likewise, if the first polymer has a low index of refraction when isotropic, it is advantageous that it also be negatively birefringent. The second polymer advantageously develops little or no birefringence when stretched, or develops birefringence of the opposite sense (positive-negative or negative-positive), such that its film-plane refractive indices differ as much as possible from those of the first polymer in the finished film. These criteria may be combined appropriately with those listed above for polarizing films if a mirror film is meant to have some degree of polarizing properties as well.

Colored films can be regarded as special cases of mirror and polarizing films. Thus, the same criteria outlined above apply. The perceived color is a result of reflection or polarization over one or more specific bandwidths of the spectrum. The bandwidths over which a multilayer film of the current invention is effective will be determined primarily by the distribution of layer thicknesses employed in the optical stack(s), but consideration must also be given to the wavelength dependence, or dispersion, of the refractive indices of the first and second polymers. It will be understood that the same rules apply to the infrared and ultraviolet wavelengths as to the visible colors.

Absorbance is another consideration. For most applications, it is advantageous for neither the first polymer nor the second polymer to have any absorbance bands within the bandwidth of interest for the film in question. Thus, all incident light within the bandwidth is either reflected or transmitted. However, for some applications, it may be useful for one or both of the first and second polymer to absorb specific wavelengths, either totally or in part.

Polyethylene 2,6-naphthalate (PEN) is frequently chosen as a first polymer for films described herein. It has a large positive stress optical coefficient, retains birefringence effectively after stretching, and has little or no absorbance within the visible range. It also has a large index of refraction in the isotropic state. Its refractive index for polarized incident light of 550 nm wavelength increases when the plane of polarization is parallel to the stretch direction from about 1.64 to as high as about 1.9. Its birefringence can be increased by increasing its molecular orientation which, in turn, may be increased by stretching to greater stretch ratios with other stretching conditions held fixed.

Other semicrystalline naphthalene dicarboxylic polyesters are also suitable as first polymers. Polybutylene 2,6-Naphthalate (PBN) is an example. These polymers may be homopolymers or copolymers, provided that the use of comonomers does not substantially impair the stress optical coefficient or retention of birefringence after stretching. The term "PEN" herein will be understood to include copolymers of PEN meeting these restrictions. In practice, these restrictions impose an upper limit on the comonomer content, the exact value of which will vary with the choice of comonomer(s) employed. Some compromise in these properties may be accepted, however, if comonomer incorporation results in improvement of other properties. Such properties include but are not limited to improved interlayer adhesion, lower melting point (resulting in lower extrusion temperature), better rheological matching to other polymers in the film, and advantageous shifts in the process window for stretching due to change in the glass transition temperature.

Suitable comonomers for use in PEN, PBN or the like may be of the diol or dicarboxylic acid or ester type. Dicarboxylic acid comonomers include but are not limited to terephthalic acid, isophthalic acid, phthalic acid, all isomeric naphthalenedicarboxylic acids (2,6-, 1,2-, 1,3-, 1,4-, 1,5-, 1,6-, 1,7-, 1,8-, 2,3-, 2,4-, 2,5-, 2,7-, and 2,8-), bibenzoic acids such as 4,4'-biphenyl dicarboxylic acid and its isomers, trans-4,4'-stilbene dicarboxylic acid and its isomers, 4,4'-diphenyl ether dicarboxylic acid and its isomers, 4,4'-diphenylsulfone dicarboxylic acid and its isomers, 4,4'-benzophenone dicarboxylic acid and its isomers, halogenated aromatic dicarboxylic acids such as 2-chloroterephthalic acid and 2,5-dichloroterephthalic acid, other substituted aromatic dicarboxylic acids such as tertiary butyl isophthalic acid and sodium sulfonated isophthalic acid, cycloalkane dicarboxylic acids such as 1,4-cyclohexanedicarboxylic acid and its isomers and 2,6-decahydronaphthalene dicarboxylic acid and its isomers, bi- or multi-cyclic dicarboxylic acids (such as the various isomeric norbornane and norbornene dicarboxylic acids, adamantane dicarboxylic acids, and bicyclo-octane dicarboxylic acids), alkane dicarboxylic acids (such as sebacic acid, adipic acid, oxalic acid, malonic acid, succinic acid, glutaric acid, azelaic acid, and dodecane dicarboxylic acid.), and any of the isomeric dicarboxylic acids of the fused-ring aromatic hydrocarbons (such as indene, anthracene, pheneanthrene, benzonaphthene, fluorene and the like). Alternatively, alkyl esters of these monomers, such as dimethyl terephthalate, may be used.

Suitable diol comonomers include but are not limited to linear or branched alkane diols or glycols (such as ethylene glycol, propanediols such as trimethylene glycol, butanediols such as tetramethylene glycol, pentanediols such as neopentyl glycol, hexanediols, 2,2,4-trimethyl-1,3-pentanediol and higher diols), ether glycols (such as diethylene glycol, triethylene glycol, and polyethylene glycol), chain-ester diols such as 3-hydroxy-2,2-dimethylpropyl-3-hydroxy-2,2-dimethyl propanoate, cycloalkane glycols such as 1,4-cyclohexanedimethanol and its isomers and 1,4-cyclohexanediol and its isomers, bi- or multicyclic diols (such as the various isomeric tricyclodecane dimethanols, norbornane dimethanols, norbornene dimethanols, and bicyclo-octane dimethanols), aromatic glycols (such as 1,4-benzenedimethanol and its isomers, 1,4-benzenediol and its isomers, bisphenols such as bisphenol A, 2,2'-dihydroxy biphenyl and its isomers, 4,4'-dihydroxymethyl biphenyl and its isomers, and 1,3-bis(2-hydroxyethoxy)benzene and its isomers), and lower alkyl ethers or diethers of these diols, such as dimethyl or diethyl diols.

Tri- or polyfunctional comonomers, which can serve to impart a branched structure to the polyester molecules, can also be used. They may be of either the carboxylic acid, ester, hydroxy or ether types. Examples include, but are not limited to, trimellitic acid and its esters, trimethylol propane, and pentaerythritol.

Also suitable as comonomers are monomers of mixed functionality, including hydroxycarboxylic acids such as parahydroxybenzoic acid and 6-hydroxy-2-naphthalenecarboxylic acid, and their isomers, and tri- or polyfunctional comonomers of mixed functionality such as 5-hydroxyisophthalic acid and the like.

Polyethylene terephthalate (PET) is another material that exhibits a significant positive stress optical coefficient, retains birefringence effectively after stretching, and has little or no absorbance within the visible range. Thus, it and its high PET-content copolymers employing comonomers listed above may also be used as first polymers in some applications.

When a naphthalene dicarboxylic polyester such as PEN or PBN is chosen as first polymer, there are several approaches which may be taken to the selection of a second polymer. One preferred approach for some applications is to select a naphthalene dicarboxylic copolyester (coPEN) formulated so as to develop significantly less or no birefringence when stretched. This can be accomplished by choosing comonomers and their concentrations in the copolymer such that crystallizability of the coPEN is eliminated or greatly reduced. One typical formulation employs as the dicarboxylic acid or ester components dimethyl naphthalate at from about 20 mole percent to about 80 mole percent and dimethyl terephthalate or dimethyl isophthalate at from about 20 mole percent to about 80 mole percent, and employs ethylene glycol as diol component. Of course, the corresponding dicarboxylic acids may be used instead of the esters. The number of comonomers which can be employed in the formulation of a coPEN second polymer is not limited. Suitable comonomers for a coPEN second polymer include but are not limited to all of the comonomers listed above as suitable PEN comonomers, including the acid, ester, hydroxy, ether, tri- or polyfunctional, and mixed functionality types.

Often it is useful to predict the isotropic refractive index of a coPEN second polymer. A volume average of the refractive indices of the monomers to be employed has been found to be a suitable guide. Similar techniques well-known in the art can be used to estimate glass transition temperatures for coPEN second polymers from the glass transitions of the homopolymers of the monomers to be employed.

In addition, polycarbonates having a glass transition temperature compatible with that of PEN and having a refractive index similar to the isotropic refractive index of PEN are also useful as second polymers. Polyesters, copolyesters, polycarbonates, and copolycarbonates may also be fed together to an extruder and transesterified into new suitable copolymeric second polymers.

It is not required that the second polymer be a copolyester or copolycarbonate. Vinyl polymers and copolymers made from monomers such as vinyl naphthalenes, styrenes, ethylene, maleic anhydride, acrylates, acetates, and methacrylates may be employed. Condensation polymers other than polyesters and polycarbonates may also be used. Examples include: polysulfones, polyamides, polyurethanes, polyamic acids, and polyimides. Naphthalene groups and halogens such as chlorine, bromine and iodine are useful for increasing the refractive index of the second polymer to a desired level. Acrylate groups and fluorine are particularly useful in decreasing refractive index when this is desired.

It will be understood from the foregoing discussion that the choice of a second polymer is dependent not only on the intended application of the multilayer optical film in question, but also on the choice made for the first polymer, and the processing conditions employed in stretching. Suitable second polymer materials include but are not limited to polyethylene naphthalate (PEN) and isomers thereof (such as 2,6-, 1,4-, 1,5-, 2,7-, and 2,3-PEN), polyalkylene terephthalates (such as polyethylene terephthalate, polybutylene terephthalate, and poly-1,4-cyclohexanedimethylene terephthalate), other polyesters, polycarbonates, polyarylates, polyamides (such as nylon 6, nylon 11, nylon 12, nylon 4/6, nylon 6/6, nylon 6/9, nylon 6/10, nylon 6/12, and nylon 6/T), polyimides (including thermoplastic polyimides and polyacrylic imides), polyamide-imides, polyether-amides, polyetherimides, polyaryl ethers (such as polyphenylene ether and the ring-substituted polyphenylene oxides), polyarylether ketones such as polyetheretherketone ("PEEK"), aliphatic polyketones (such as copolymers and terpolymers of ethylene and/or propylene with carbon dioxide), polyphenylene sulfide, polysulfones (includine polyethersulfones and polyaryl sulfones), atactic polystyrene, syndiotactic polystyrene ("sPS") and its derivatives (such as syndiotactic poly-alpha-methyl styrene and syndiotactic polydichlorostyrene), blends of any of these polystyrenes (with each other or with other polymers, such as polyphenylene oxides), copolymers of any of these polystyrenes (such as styrene-butadiene copolymers, styrene-acrylonitrile copolymers, and acrylonitrile-butadiene-styrene terpolymers), polyacrylates (such as polymethyl acrylate, polyethyl acrylate, and polybutyl acrylate), polymethacrylates (such as polymethyl methacrylate, polyethyl methacrylate, polypropyl methacrylate, and polyisobutyl methacrylate), cellulose derivatives (such as ethyl cellulose, cellulose acetate, cellulose propionate, cellulose acetate butyrate, and cellulose nitrate), polyalkylene polymers (such as polyethylene, polypropylene, polybutylene, polyisobutylene, and poly(4-methyl)pentene), fluorinated polymers and copolymers (such as polytetrafluoroethylene, polytrifluoroethylene, polyvinylidene fluoride, polyvinyl fluoride, fluorinated ethylene-propylene copolymers, perfluoroalkoxy resins, polychlorotrifluoroethylene, polyethylene-co-trifluoroethylene, polyethylene-co-chlorotrifluoroethylene), chlorinated polymers (such as polyvinylidene chloride and polyvinyl chloride), polyacrylonitrile, polyvinylacetate, polyethers (such as polyoxymethylene and polyethylene oxide), ionomeric resins, elastomers (such as polybutadiene, polyisoprene, and neoprene), silicone resins, epoxy resins, and polyurethanes.

Also suitable are copolymers, such as the copolymers of PEN discussed above as well as any other non- naphthalene group-containing copolyesters which may be formulated from the above lists of suitable polyester comonomers for PEN. In some applications, especially when PET serves as the first polymer, copolyesters based on PET and comonomers from said lists above (coPETs) are especially suitable. In addition, either first or second polymers may consist of miscible or immiscible blends of two or more of the above-described polymers or copolymers (such as blends of sPS and atactic polystyrene, or of PEN and sPS). The coPENs and coPETs described may be synthesized directly, or may be formulated as a blend of pellets where at least one component is a polymer based on naphthalene dicarboxylic acid or terephthalic acid and other components are polycarbonates or other polyesters, such as a PET, a PEN, a coPET, or a co-PEN.

Another preferred family of materials for the second polymer for some applications are the syndiotactic vinyl aromatic polymers, such as syndiotactic polystyrene. Syndiotactic vinyl aromatic polymers useful in the current invention include poly(styrene), poly(alkyl styrene)s, poly(aryl styrene)s, poly(styrene halide)s, poly(alkoxy styrene)s, poly(vinyl ester benzoate), poly(vinyl naphthalene), poly(vinylstyrene), and poly(acenaphthalene), as well as the hydrogenated polymers and mixtures or copolymers containing these structural units. Examples of poly(alkyl styrene)s include the isomers of the following: poly(methyl styrene), poly(ethyl styrene), poly(propyl styrene), and poly(butyl styrene). Examples of poly(aryl styrene)s include the isomers of poly(phenyl styrene). As for the poly(styrene halide)s, examples include the isomers of the following: poly(chlorostyrene), poly(bromostyrene), and poly(fluorostyrene). Examples of poly(alkoxy styrene)s include the isomers of the following: poly(methoxy styrene) and poly(ethoxy styrene). Among these examples, particularly preferable styrene group polymers, are: polystyrene, poly(p-methyl styrene), poly(m-methyl styrene), poly(p-tertiary butyl styrene), poly(p-chlorostyrene), poly(m-chloro styrene), poly(p-fluoro styrene), and copolymers of styrene and p-methyl styrene.

Furthermore, comonomers may be used to make syndiotactic vinyl aromatic group copolymers. In addition to the monomers for the homopolymers listed above in defining the syndiotactic vinyl aromatic polymers group, suitable comonomers include olefin monomers (such as ethylene, propylene, butenes, pentenes, hexenes, octenes or decenes), diene monomers (such as butadiene and isoprene), and polar vinyl monomers (such as cyclic diene monomers, methyl methacrylate, maleic acid anhydride, or acrylonitrile).

The syndiotactic vinyl aromatic copolymers may be block copolymers, random copolymers, or alternating copolymers.

The syndiotactic vinyl aromatic polymers and copolymers referred to herein generally have syndiotacticity of higher than 75% or more, as determined by carbon-13 nuclear magnetic resonance. Preferably, the degree of syndiotacticity is higher than 85% racemic diad, or higher than 30%, or more preferably, higher than 50%, racemic pentad.

In addition, although there are no particular restrictions regarding the molecular weight of these syndiotactic vinyl aromatic polymers and copolymers, preferably, the weight average molecular weight is greater than 10,000 and less than 1,000,000, and more preferably, greater than 50,000 and less than 800,000.

The syndiotactic vinyl aromatic polymers and copolymers may also be used in the form of polymer blends with, for instance, vinyl aromatic group polymers with atactic structures, vinyl aromatic group polymers with isotactic structures, and any other polymers that are miscible with the vinyl aromatic polymers. For example, polyphenylene ethers show good miscibility with many of the previous described vinyl aromatic group polymers.

When a polarizing film is made using a process with predominantly uniaxial stretching, particularly preferred combinations of polymers for optical layers include PEN/coPEN, PET/coPET, PEN/sPS, PET/sPS, PEN/Eastar,™ and PET/Eastar,™ where "coPEN" refers to a copolymer or blend based upon naphthalene dicarboxylic acid (as described above) and Eastar™ is a polyester or copolyester (believed to comprise cyclohexanedimethylene diol units and terephthalate units) commercially available from Eastman Chemical Co. When a polarizing film is to be made by manipulating the process conditions of a biaxial stretching process, particularly preferred combinations of polymers for optical layers include PEN/coPEN, PEN/PET, PEN/PBT, PEN/PETG and PEN/PETcoPBT, where "PBT" refers to polybutylene terephthalate, "PETG"refers to a copolymer of PET employing a second glycol (usually cyclohexanedimethanol), and "PETcoPBT" refers to a copolyester of terephthalic acid or an ester thereof with a mixture of ethylene glycol and 1,4-butanediol.

Particularly preferred combinations of polymers for optical layers in the case of mirrors or colored films include PEN/PMMA, PET/PMMA, PEN/Ecdel,™ PET/Ecdel,™ PEN/sPS, PET/sPS, PEN/coPET, PEN/PETG, and PEN/THV,™ where "PMMA" refers to polymethyl methacrylate, Ecdel™ is a thermoplastic polyester or copolyester (believed to comprise cyclohexanedicarboxylate units, polytetramethylene ether glycol units, and cyclohexanedimethanol units) commercially available from Eastman Chemical Co., "coPET" refers to a copolymer or blend based upon terephthalic acid (as described above), "PETG" refers to a copolymer of PET employing a second glycol (usually cyclohexanedimethanol), and THV™ is a fluoropolymer commercially available from 3M Co.

For mirror films, a match of the refractive indices of the first polymer and second polymer in the direction normal to the film plane is preferred, because it provides for constant reflectance with respect to the angle of incident light (that is, there is no Brewster's angle). For example, at a specific wavelength, the in-plane refractive indices might be 1.76 for biaxially oriented PEN, while the film plane-normal refractive index might fall to 1.49. When PMMA is used as the second polymer in the multilayer construction, its refractive index at the same wavelength, in all three directions, might be 1.495. Another example is the PET/Ecdel™ system, in which the analogous indices might be 1.66 and 1.51 for PET, while the isotropic index of Ecdel™ might be 1.52. The important property is that the normal-to-plane index for one material be closer to the in-plane indices of the other material than to its own in-plane indices.

It is sometimes preferred for the multilayer optical films to consist of more than two distinguishable polymers. A third or subsequent polymer might be fruitfully employed as an adhesion-promoting layer between the first polymer and the second polymer within an optical stack, as an additional component in a stack for optical purposes, as a protective boundary layer between optical stacks, as a skin layer, as a functional coating, or for any other purpose. As such, the composition of a third or subsequent polymer, if any, is not limited. Preferred multicomponent constructions are described in the copending application entitled "Multicomponent Optical Body" filed on Jan. 13, 1998 as application Ser. No. 09/006,118.

Returning now to our general discussion of the multilayer film, it has been found that substantial differences between the Z-index of adjacent layers can be tolerated and still maintain adequate optical performance of the multilayer film over a wide range of entrance angles. Basically, the more closely the Z-indices are matched, the greater the range of entrance angles over which the amplitude and fractional bandwidth of a given transmission band stay within specified limits. It is preferred that the Z-index mismatch of adjacent layers be no more than half, and more preferably no more than about 20%, of the maximum in-plane mismatch between such layers. The in-plane mismatch is typically on the order of at least 0.05 in refractive index.

Turning again to FIG. 8, it has been noted that the transmission spectrum of s-polarized light at the nonzero entrance angle is not depicted. For completeness a verbal description follows. As the entrance angle increases from zero degrees, the cut-on and cut-off transitions making up a given s-polarization transmission band are blue-shifted by different amounts such that they overlap in a way that progressively diminishes the amplitude of the band. To first order, the center wavelength of the diminished s-polarization band approximately tracks the center wavelength of the p-polarization band. At out-of-band wavelengths, the s-polarization transmission progressively decreases (reflectance increases) with increasing entrance angle relative to its initially low level. It should be noted that the s-polarization transmission spectrum changes in the same way with entrance angle whether the multilayer film is the preferred z-index matched polymeric construction or the nonpreferred isotropic layer construction. This, of course, is because s-polarized light has no E-field component in the Z-direction.

At high entrance angles, light transmitted through the transmission band(s) of the multilayer film will be predominantly p-polarized due to the disappearing s-polarization transmission band(s). The indicia layer, if there is one, does not typically disturb the polarization state. However, multiple reflections occuring in the retroreflective layer will generally produce a retroreflected beam whose polarization is "scrambled" relative to the predominantly p-polarized beam transmitted through the multilayer film. Even though the wavelength of the retroreflected light is inherently matched with the transmission band(s) of the multilayer film, only a portion (chiefly the p-polarization component) of the initially retroreflected light will be transmitted outside of the combined reflective/retroreflective article. Advantageously, a substantial portion of the retroreflected light not initially transmitted by the multilayer film ultimately is transmitted after one or more reflection/retroreflection cycles due to the high reflectivity (low absorption) of the multilayer film, the high efficiency of the retroreflector elements, and the polarization-scrambling properties of the retroreflector elements. The brightness of the patterned retroreflected beam is enhanced by this "recycling" of light between the low loss multilayer film and retroreflecting layer.

Modifications of the reflective/retroreflective articles discussed above can be made which make use of the spectral shift of a narrow bandwidth transmission window as a function of entrance angle. In one such modification, the patterned regions (e.g. 12a in layer 12 of FIGS. 1 and 3) in the indicia layer can comprise conventional inks, dyes, or other substances which are substantially opaque to some wavelengths but transparent to others. For example, the bar code shown on layer 12 in FIG. 1 can include "blue" stripes which are transparent to blue and absorbing to green and red light, and "red" stripes which are transparent to red and absorbing to blue and green light. At a first entrance angle such as zero degrees (normal incidence), the multilayer film transmits some red wavelengths but reflects green and blue light. At this first entrance angle the blue stripes will be apparent in retroreflected light since those stripes absorb red light to distinguish from the transparent background of the indicia layer. The red stripes will blend in with the red-transmitting background and thus be nearly indiscernable. Increasing the entrance angle somewhat to a second entrance angle blue-shifts the transmission window so the multilayer film transmits some green wavelengths but reflects blue and red. At this second entrance angle both the red and blue stripes will be apparent in retroreflected light since they both absorb green light. Increasing the entrance angle still further to a third entrance angle blue-shifts the transmission window so the multilayer film transmits some blue wavelengths but reflects green and red. In this case the red stripes will be distinguishable in retroreflectance, while the blue stripes will blend in with the blue-transmitting background.

The use of colorants which selectively absorb certain wavelengths of light and transmit others can therefore be used in the indicia layer and/or in the retroreflecting layer, together with the narrow band multilayer optical film, to create independent patterns that are viewable at different orientations and at different wavelengths of light. Each of the colorants in effect limits detection of the respective pattern to a narrow viewing zone corresponding to an angle at which the multilayer film transmits in the wavelength range of the colorant. Multilayer optical films that have relatively wide transmission bands, or that have long- or short-pass transmission characteristics, can also be used in such an arrangement. All that is needed is a cut-on or cut-off transition which moves across at least one of the colorant transmission bands as the article is tilted.

The multilayer film in any of the disclosed embodiments is preferably spatially uniform across the face of the article. However, the film can alternatively incorporate neighboring regions specifically tailored to exhibit differing optical properties. For example, one or more regions of an initially uniform multilayer film can be embossed using heat and pressure. The embossed regions are thinner than non-embossed neighboring regions and therefore have spectral transmission and reflection features which are blue-shifted relative to corresponding features of the non-embossed regions. The embossed regions can take the form of another information conveying pattern in addition to patterns contained in the indicia layer and/or the retroreflective layer. The combination of embossed and non-embossed regions can be used to achieve two or more retroreflected colors.

Figure 9:
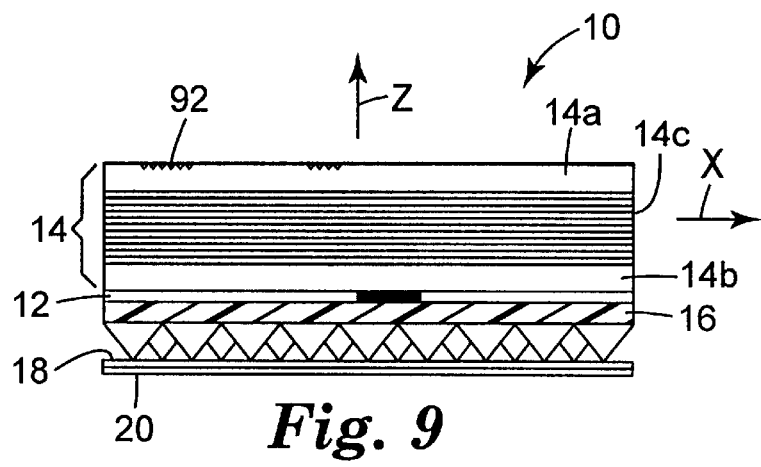
FIGS. 9 and 10 show the article of FIG. 3 in section, but additionally include microstructured relief patterns which produce holographic images.

In a related construction, the multilayer film can contain or carry a microstructured relief pattern suitable for producing conventional holographic images. Such images can be used to further obscure the information-conveying pattern disposed beneath the multilayer film. The relief pattern can be formed using known holographic embossing techniques into a suitable skin layer or coating on top of the multilayer film. The relief pattern can alternately be incorporated into a separate transparent sheet which is laminated to the multilayer film. Reference is made generally to U.S. Pat. No. 5,656,360 (Faykish et al.). Such a separate transparent sheet is perferably polymeric for ease of manufacture and for article integrity over operating temperature ranges. FIG. 9 shows the sectional view of FIG. 3 with the addition of a microstructured relief pattern 92 formed in the front skin layer 14a. Microstructured relief pattern 92 is embossed or otherwise formed on the outer surface of the skin layer following processing of the multilayer film 14. A transparent polymeric film or sheet can be laminated over layer 14a to protect the microstructured relief pattern. Pattern 92 produces very noticeable holographic images in ambient diffuse lighting conditions but not in retroreflective viewing conditions. The holograms thus can be included to enhance the effectiveness of the reflective/retroreflective article for authentication or decorative purposes.

Figure 10:
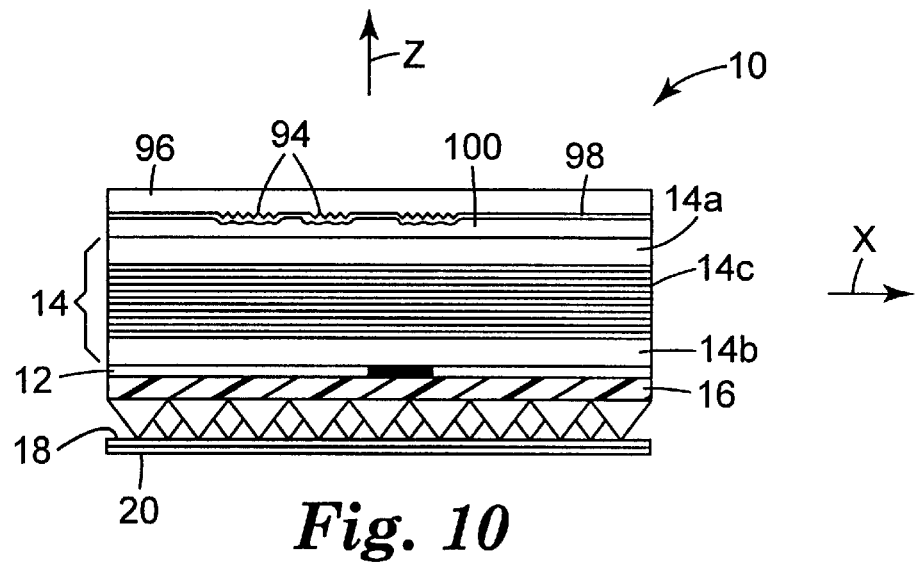

Alternatively, preformed transparent holographic sheeting can be laminated to the multilayer polymeric optical film. In the embodiment shown in FIG. 10, a hologram-producing microstructured relief pattern 94 is provided on the back side of a transparent sheet 96. A material 98 of higher refractive index than sheet 96 is coated on the back side to produce the desired brightness of the hologram. Material 98 is substantially transparent and colorless; illustrative examples include vacuum-coated bismuth trioxide, zinc sulfide, titanium dioxide, and zirconium oxide. An adhesive layer 100, which can comprise a conventional pressure sensitive adhesive, hot melt adhesive, or cureable epoxy, is also shown.

Transition-Preserving Color Shifting Film Example: Green Narrowband

A coextruded film containing 417 layers was made on a sequential flat-film making line via a coextrusion process. This multilayer polymer film was made from PEN and a thermoplastic elastomer known as Ecdel 9967 available from Eastman Chemical Co. A feedblock method similar to that of U.S. Pat. No. 3,801,429 (Schrenk et al.) was used to generate an intermediate meltstream having about 209 layers with a layer thickness profile sufficient to produce an optical reflection band with a fractional bandwidth of about 30%.

PEN: 60 wt. % phenol/40 wt. % dichlorobenzene with an Intrinsic Viscosity (IV) of 0.48 dl/g was delivered to the feedblock by one extruder at a rate of 19.2 kg/hr and the Ecdel elastomer was delivered by another extruder at a rate of 40.7 kg/hr. These initial meltstreams were directed to the feedblock which distributed them to produce an intermediate meltstream having 209 alternating layers of PEN and Ecdel, including two outside layers of PEN serving as protective boundary layers (PBLs) through the feedblock. The 209 layers have an approximate layer thickness profile created by the feedblock dimensions and the film extrusion rates. After the feedblock, the same PEN extruder delivered additional PEN to the outside layers of the intermediate meltstream (also referred to as the "extrudate") at about 13.5 kg/hr total flow to serve as PBLs for the multiplier stage which immediately followed.

An asymmetric two times multiplier then split the extrudate into two meltstreams of unequal width, the widths being related by a "multiplier ratio". The two meltstreams were widened to a common dimension, and their thicknesses diminished accordingly before the two meltstreams were combined one on top of the other. The combined meltstream thus consisted of two meltstreams having the same number (209) and composition of constituent layers, but where the thickness of the constituent layers in one meltstream differed from those in the other meltstream by the multiplier ratio. This construction yielded a finished film which had two similar spectral features, one blue-shifted relative to the other due to the thickness difference. Slight differences in layer thickness are introduced into the extrudate by the multiplier, and account for differences in such spectral features.

After the multiplier, symmetric PBLs as outside skin layers were added at about 12.5 Kg/hour (total) that was fed from a third extruder. The resulting meltstream passed through a film die and onto a water-cooled casting wheel. The casting wheel speed was adjusted for precise control of final film thickness, and therefore, final color. The inlet water temperature on the casting wheel was about 7 degrees Celsius. The Ecdel melt process equipment was maintained at about 249 degrees C.; the PEN melt process equipment and the feedblock were maintained at about 285 degrees C. The skin-layer modules, multiplier and die were maintained at about 290 degrees C.

A high voltage pinning system was used to pin the meltstream extrudate to the casting wheel as it exited the die. The pinning wire was about 0.17 mm thick and a voltage of about 5.5 kV was applied. The pinning wire was positioned manually by an operator about 3 to 5 mm from the web at the point of contact to the casting wheel to obtain a smooth appearance to the cast web. The cast web was continuously oriented by conventional sequential length orienter (LO) and tenter equipment. The web was length oriented to a draw ratio of 3.5 at about 135 degrees C. The film was preheated in a 138 degree C. tenter preheat zone for about 25 seconds and drawn at 140 degree C. in the transverse direction to a draw ratio of about 5.0 at a rate of about 16% per second. The finished film had a final thickness of about 0.05 mm.

Figure 11:
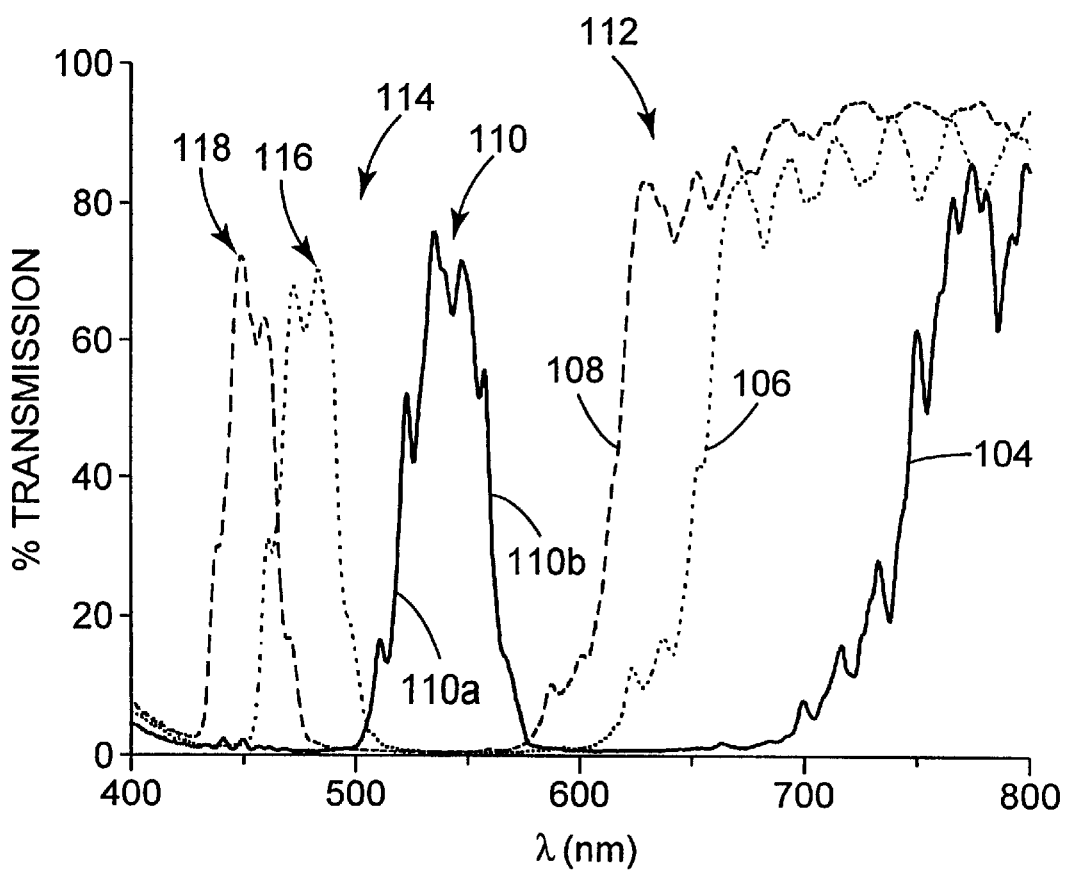
FIG. 11 shows measured percent transmission spectra of a multilayer polymeric film example useable in the invention.

Visually the film had a highly reflective, shiny appearance in ambient room light when viewed against a dark background. White light sources appeared vivid green when viewed through the film by itself, for light passing orthogonally through the film. Increasing the incident light entrance angle by tilting the film produced a progression of colors from green to magenta and then to orange. FIG.11 shows the percent transmission measured for normally incident light (curve 104) and for p-polarized light at 45 and 60 degree entrance angles (curves 106, 108). Percent reflectance is 100% minus percent transmission over the wavelengths shown to within about 1%. Curve 104 has a narrow transmission band 110 having a cut-on transition 110a and a cut-off transition 110b disposed between two broad reflection bands (spectral regions of low transmission) 112,114 which are spectrally separated. Reflection band 112 is seen to have a fractional bandwidth of about 30% (~200 nm÷650 nm). Band 114 has the same fractional bandwidth but is blue-shifted due to the asymmetric multiplier operation discussed above. Transmission band 110 has a relatively small fractional bandwidth of about 10% (~50 nm÷530 nm). The maximum percent transmission for band 110 is seen to be fairly high, at slightly over 70%. Thus, maximum transmission for two passes through the film (ignoring light recycling) will be about 50%. The film is also seen to have greater than 90% reflectance over about 75% of the visible spectrum. The shape of p-polarized transmission band 116 in curve 106, and of band 118 in curve 108, compares favorably with band 104: these bands have a maximum percent transmission of about 70% and a fractional bandwidth of about 10% or less.

Multilayer Film Having Sharpened Spectral Transitions

Figure 12A:
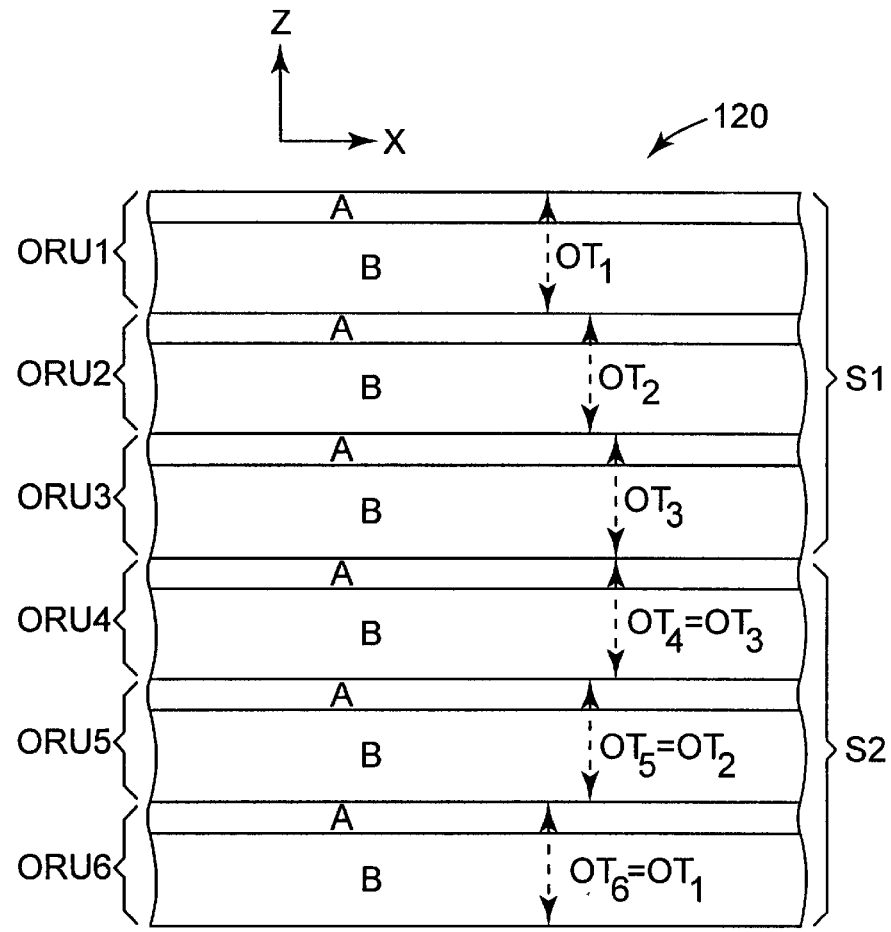
FIG. 12A shows an enlarged and exaggerated sectional view of a simplified multilayer film designed to exhibit sharp spectral transitions.
Figure 12B:
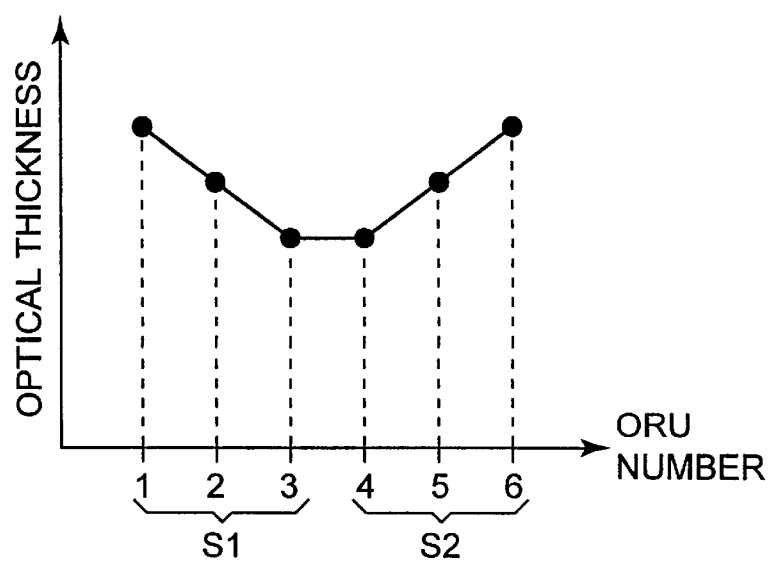
FIG. 12B is a graph of optical thickness of the optical repeating units (ORUs) comprising the film of FIG. 12A.

It has been found that multilayer films having certain film layer profiles can produce much sharper spectral transitions than previously achievable. FIG. 12a shows a cross-sectional view of a film structure which is not to scale but which is helpful in describing such desirable profiles. As shown, multilayer film 120 comprises 12 individual layers arranged in an alternating sequence of two optical materials: "A" and "B" material. Three or more distinct optical materials can be used in other embodiments. Each pair of adjacent "A" and "B" layers make up an ORU, beginning at the top of the film with ORU1 and ending with ORU6, with the ORUs having optical thicknesses $OT_1$, $OT_2$, ... $OT_6$. These optical thicknesses are the same as the term "$D_r$" identified in equation I above. For maximum first order reflectance (M=1 in equation I) at a design wavelength, each of the ORUs should have a 50% f-ratio with respect to either the A or B layer. The A layers can be considered to have a higher X- (in-plane) refractive index than the B layers, since the former are shown thinner than the latter. ORUs 1–3 are shown grouped into a multilayer stack S1 in which the optical thickness of the ORUs decrease monotonically in the minus-Z direction. ORUs 4–6 are shown grouped into another multilayer stack S2 in which the optical thickness of the ORUs increase monotonically. This ORU optical thickness profile is depicted in FIG. 12b. Thickness profiles such as this are helpful in producing sharpened spectral transitions. Before proceeding with examples of such preferred profiles, however, an example of a bandpass filter without band edge sharpening will be described.

Figure 13A:
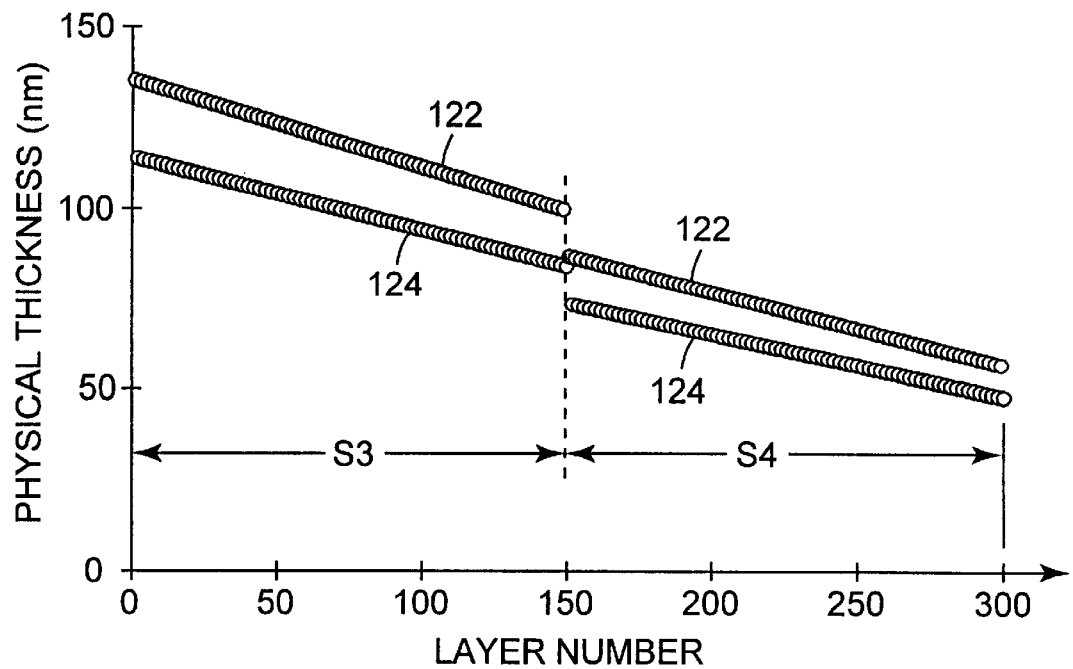
FIG. 13A is a graph of physical thickness of individual layers of a bandpass multilayer film.
Figure 13B:
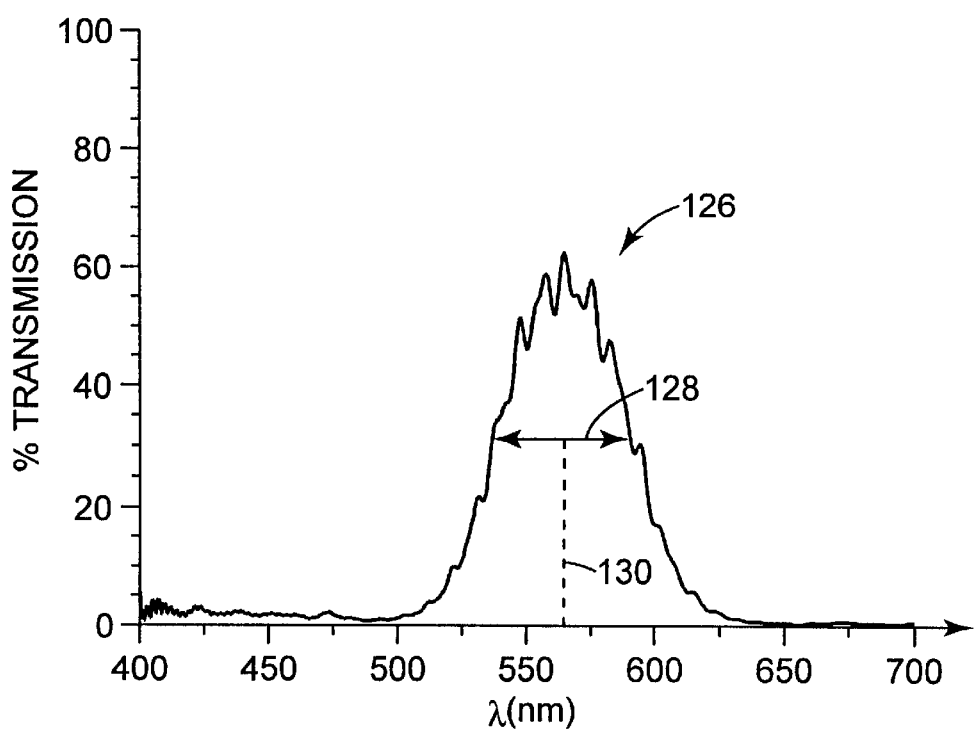
FIG. 13B is a computed on-axis transmission spectrum of the film of FIG. 13A.

FIG. 13A illustrates the design of a bandpass multilayer film made up of 300 individual layers. The physical thickness of each individual layer in the film is shown, beginning at the top or front of the film and proceeding toward the bottom or back of the film. Data points 122 represent a material having an in-plane refractive index of 1.5 (e.g., PMMA) and points 124 represent a material having an in-plane refractive index of 1.75 (e.g. PEN). Layer numbers 1 and 2 constitute the "first" ORU, layers 3 and 4 constitute the second ORU, and so on. The optical thickness of a given ORU equals the sum of the optical thickness of the high and low index layer. Layers 1 to 150 constitute a first multilayer stack S3 and layers 151 to 300 constitute a second multilayer stack S4. Both such component stacks have a monotonically decreasing ORU optical thicknesses. The discontinuity in optical thickness between the two stacks gives rise to a simple notch transmission band 126, shown in FIG. 13B. FIG. 13B was calculated from the multilayer film of FIG. 12A using the 4×4 matrix methods of Berreman as outlined in Azzam & Bashara, *Ellipsometry And Polarized Light*, assuming normally incident light and constant refractive index as a function of wavelength (no dispersion). Band 126 has a peak transmission of about 60%, a full width at half maximum 128 of about 50 nm, and a center wavelength as shown by line 130 of about 565 nm. The fractional bandwidth of band 126 is slightly below 10%. Reflectance is at least 80% over about 75% of the visible spectrum.

A film having a much smaller fractional bandwidth can be made by providing additional layers (ORUs) having a particular optical thickness profile which have the effect of sharpening the spectral cut-on and cut-off transitions. FIG.

Figure 14A:
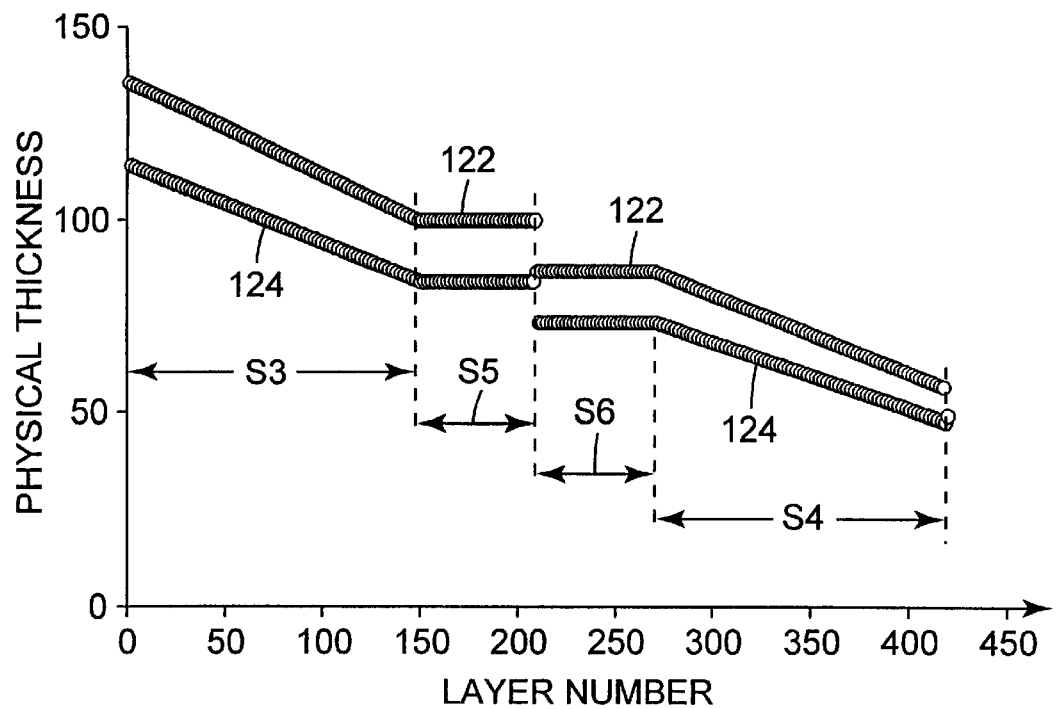
FIG. 14A is a graph of physical thickness of individual layers of a bandpass multilayer film having sharper spectral transitions.
Figure 14B:
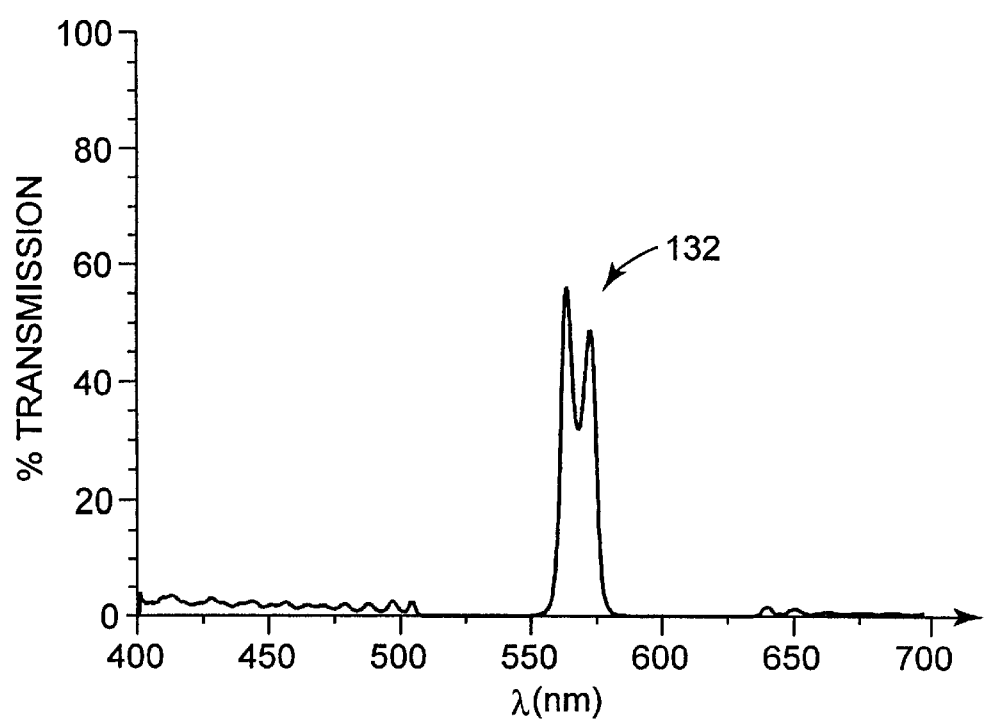
FIG. 14B is a computed on-axis transmission spectrum of the film of FIG. 14A.

14A illustrates the design of such a film. Data points 122,124 stand for the same materials as in FIG. 13A, having refractive indices 1.5 and 1.75 respectively, and the series of 150 layers in multilayer stacks S3 and S4 have the same graded linear thickness distribution as in FIG. 13A. The film of FIG. 14A simply adds stacks S5, S6 having substantially constant (non-graded) optical thickness ORUs between stacks S3,S4. The ORUs of stack S5 have an optical thickness substantially equal to the minimum optical thickness of stack S3, and the ORUs of stack S6 have an optical thickness substantially equal to the maximum optical thickness of stack S4. The same relationship also applies to each constituent of the ORUs. The calculated on-axis spectrum for the illustrated stack is given in FIG. 14B, showing a much sharper transmission band 132. The percent bandwidth of band 132 is on the order of 3% or less.

Figure 15A:
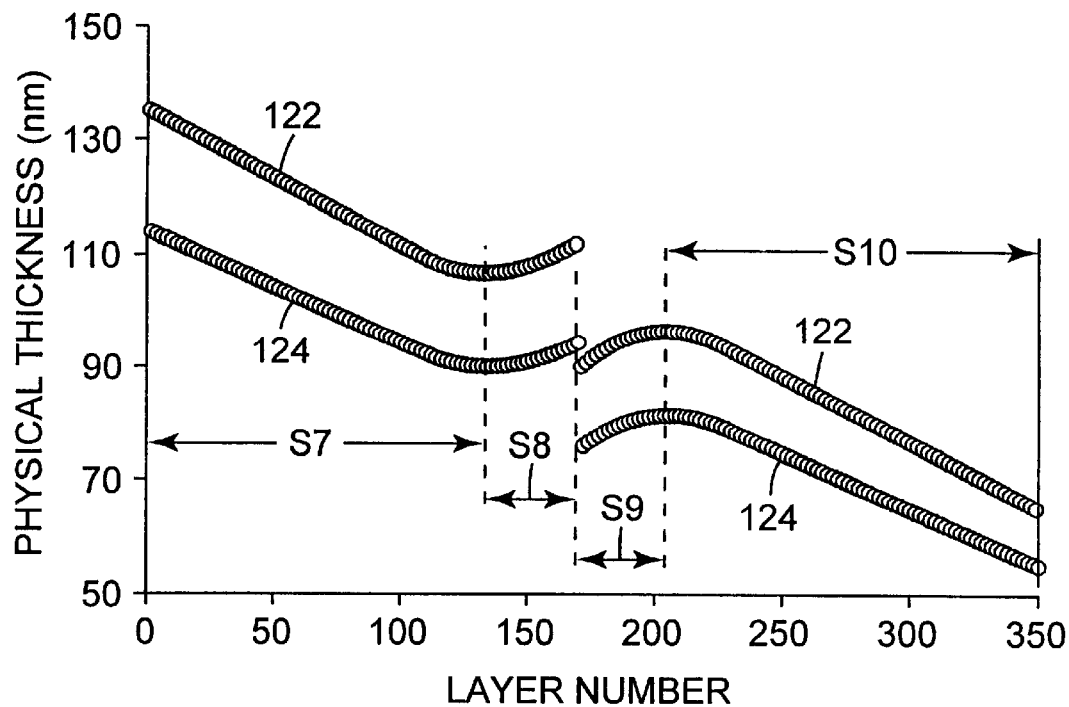
FIG. 15A is a graph of physical thickness of individual layers of a bandpass multilayer film having still sharper spectral transitions.

Another multilayer film, whose design is shown in FIG. 15A, was created to improve peak transmission and to make even steeper band edges (narrower transmission band). This was achieved with the same materials used for data points 122,124, by arranging the individual layers into component multilayer stacks S7–S10 as shown, where the stacks S8 and S9 have oppositely curved thickness profiles and the adjacent portions of stacks S7 and S10 have a slightly curved profile to match the curvature of stacks S8 and S9, respectively. The curved profile can follow any number of functional forms; the main purpose of the form is to break the exact repetition of thickness present in a quarter wave stack with layers tuned to only a single wavelength. The particular function used here is an additive function of a linear profile (the same as used on the short wavelength side of S7 and the long wavelength side of S10) and a sinusoidal function to curve the profile with an appropriate negative or positive first derivative. An important feature is that the second derivative of the ORU thickness profile be negative for the red (long wavelength) band edge of a reflectance stack and positive for the blue (short wavelength) band edge of a reflectance stack. Note that the opposite sense is required if one refers to the band edges of the notched transmission band. Other embodiments of the same principle include layer profiles that have multiple points with a zero value of the first derivative. In all cases here, the derivatives refer to those of a best fit curve fitted through the actual ORU optical thickness profile, which can contain small statistical errors of less than 10% sigma one standard deviation in optical thickness values.

Figure 15B:
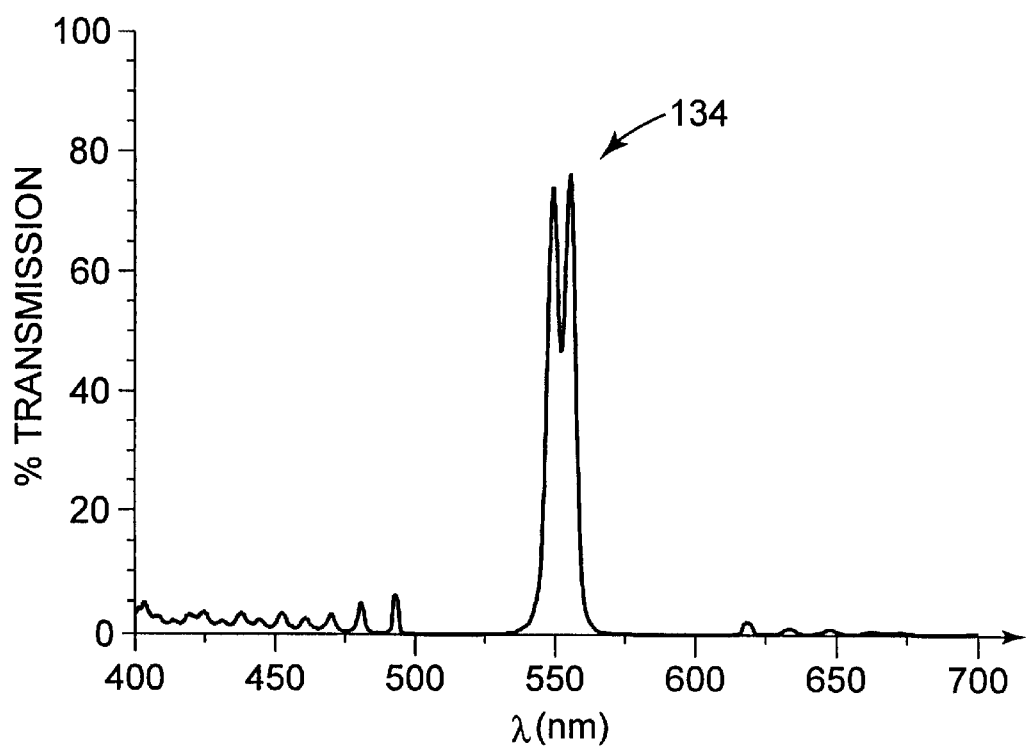
FIGS. 15B and 15C show computed on- and off-axis transmission spectra respectively of the film of FIG. 15A.
Figure 15C:
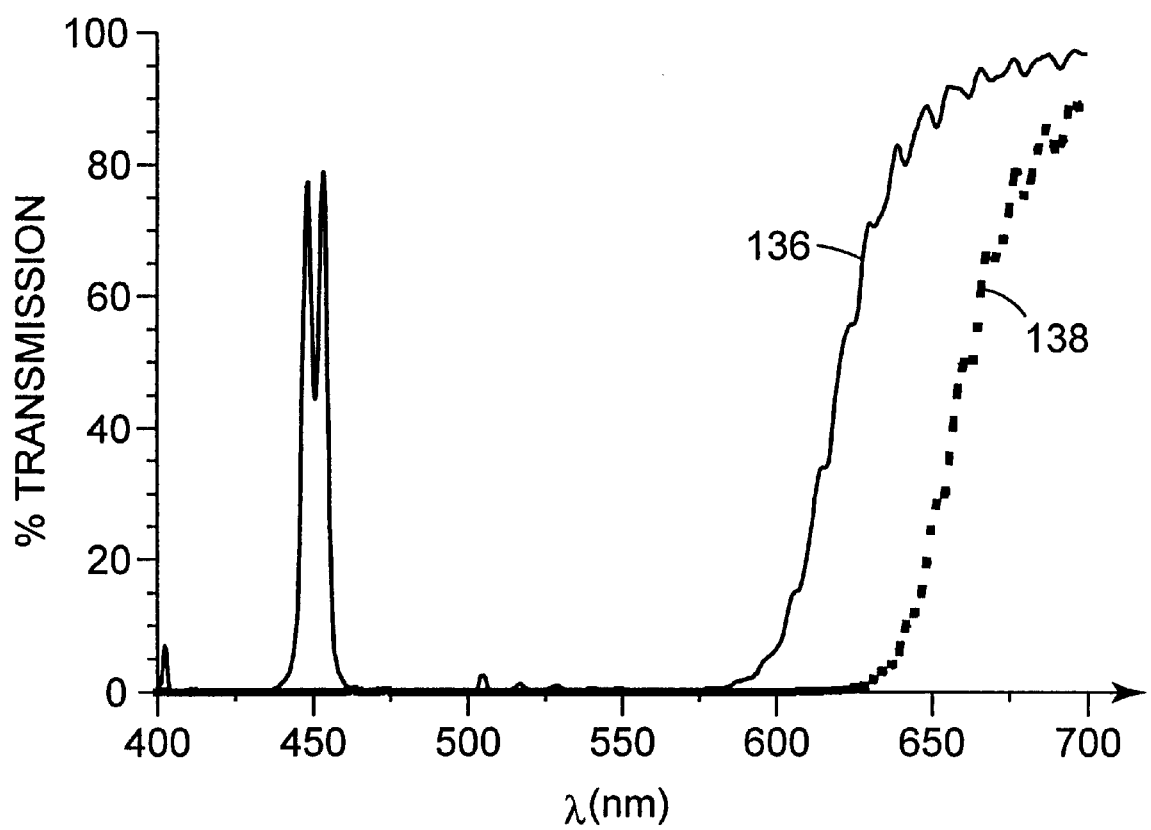

FIG. 15B shows the calculated on-axis transmission of the film of FIG. 15A. Peak transmission of the band 134 is above 75%, and fractional bandwidth is on the order of 2% or less. Off-axis transmission spectra, for both p- and s-polarizations, were also calculated and are shown as curves 136, 138 respectively in FIG. 15C. The calculation was done for an entrance angle of 60 degrees and assumed that the out-of-plane refractive indices of the two types of layers were matched, at an index of 1.5. Note the preservation of the high peak transmission and the small fractional bandwidth for p-polarization. Note also that the transmission peak for s-polarization has disappeared. However, broader transmission bands which were disposed in the near infrared region on-axis are now visible for both s- and p-polarization in the red end of the spectrum in FIG. 15C.

Similar transition-sharpening techniques can used for multilayer films having broader transmission features, such as high- or low-pass filters. Several such examples are given below. In some embodiments the physical thickness of each layer constituting an ORU is varied at the same pace across the thickness of the film, for example according to the same linear function, while in others the thickness of the layers constituting an ORU are varied differently. In each of the following examples the high and low index layers have an index of 1.75 and 1.5, respectively, and are dispersionless.

|  | S11 | S12 | S13 | S14 | S15 |
|---|---|---|---|---|---|
| Total number of layers | 170 | 30 | 30 | 30 | 30 |
| High index beginning layer thickness (nm) | 154.6 | 112.4 | 112.4 | 112.4 | 112.4 |
| High index layer thickness increment (nm) | −0.4965 | 0.726 | 0.726 | 0 | 0.726 |
| Low index beginning layer thickness (nm) | 183.3 | 133.3 | 133.3 | 133.3 | 133.3 |
| Low index layer thickness increment (nm) | −0.5882 | 0.8608 | 0 | 0 | −0.5882 |
| Beginning ORU optical thickness (nm) | 545.5 | 396.65 | 396.65 | 396.65 | 396.65 |
| ORU optical thickness increment (nm) | −1.7512 | 2.5617 | 1.2705 | 0 | 0.3882 |

Figure 16A:
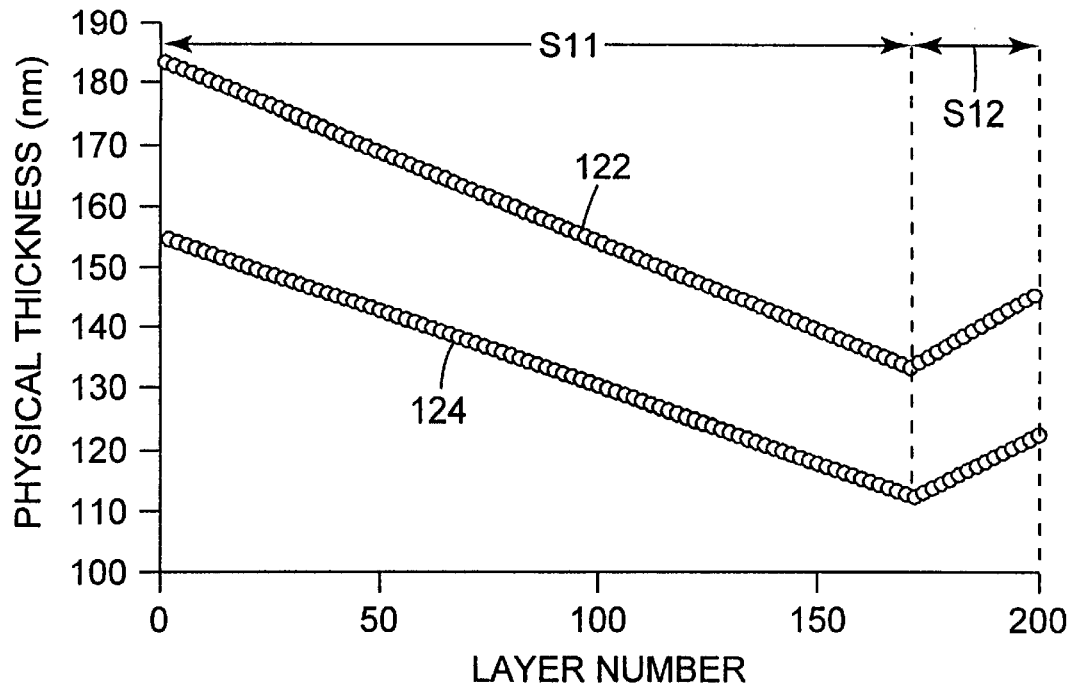
FIGS. 16A, 17A, 18A, and 19A are graphs of physical thickness of individual layers of additional multilayer films.
Figure 16B:
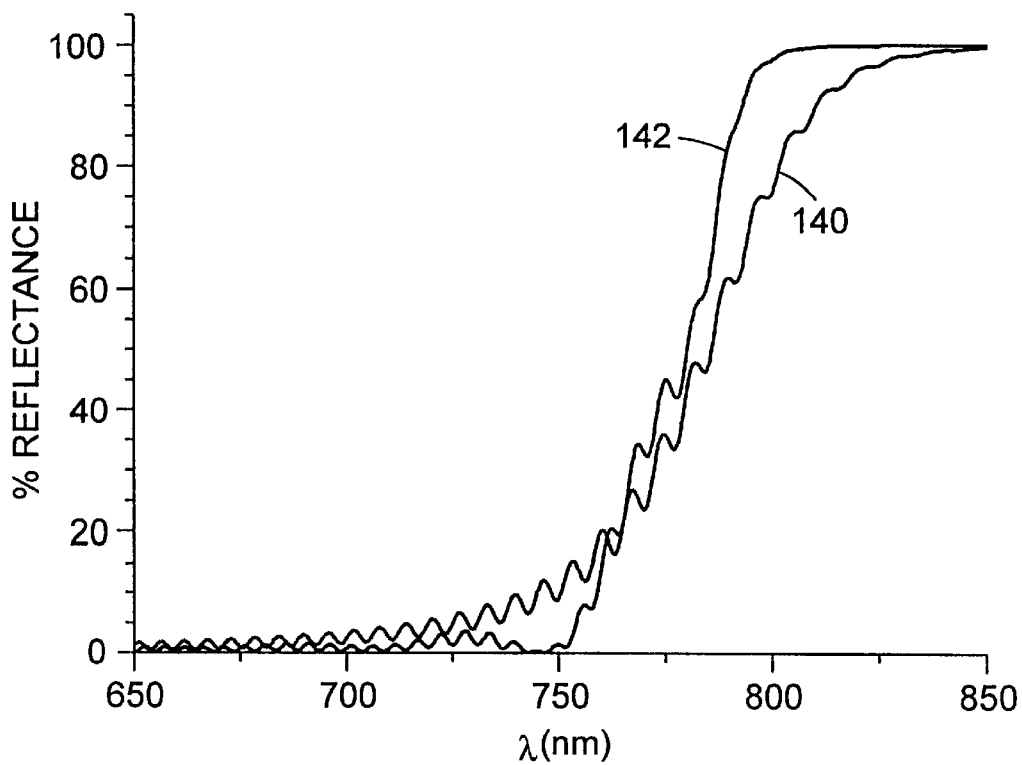
FIGS. 16B, 17B, 18B, and 19B show computed on-axis reflectance spectra of the respective films.
Figure 17A:
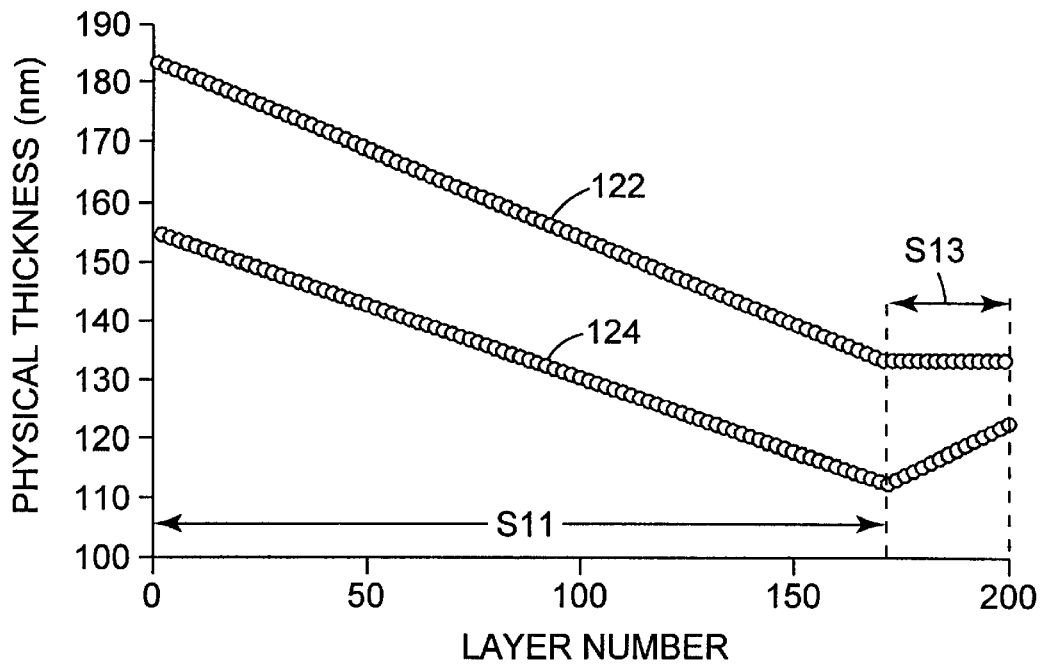
Figure 17B:
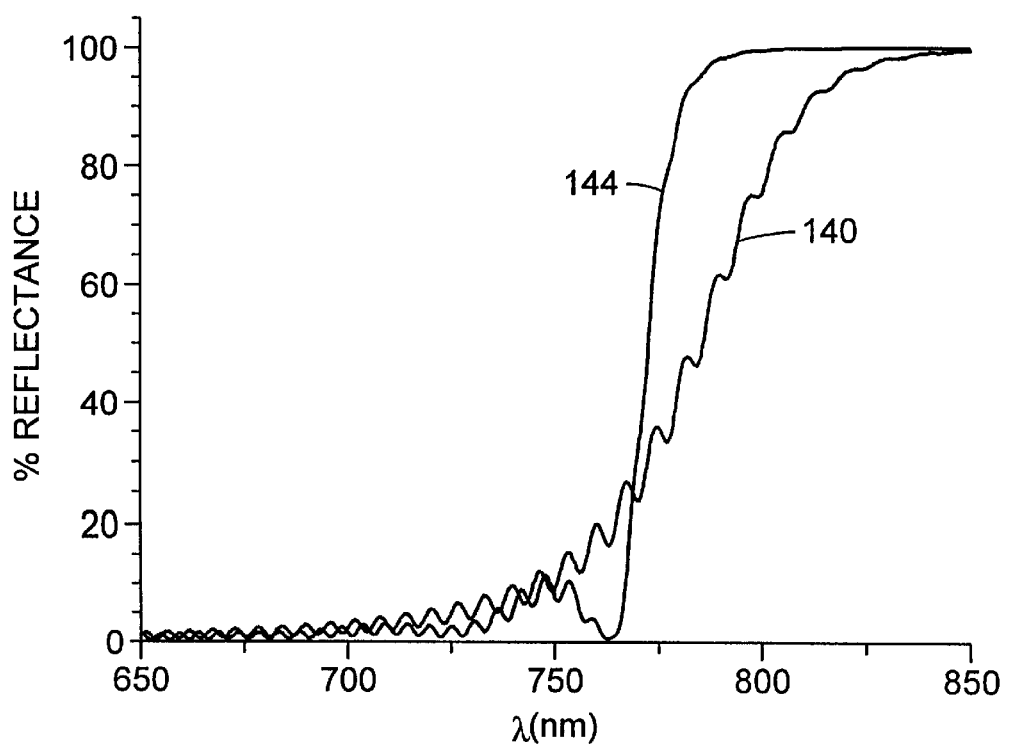
Figure 18A:
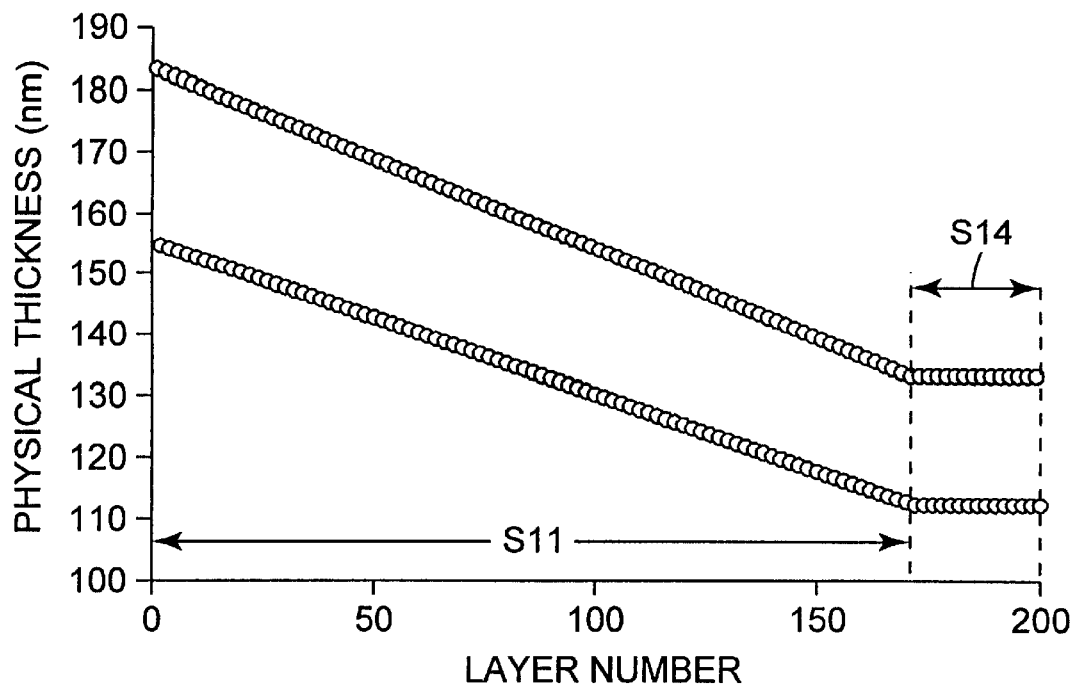
Figure 18B:
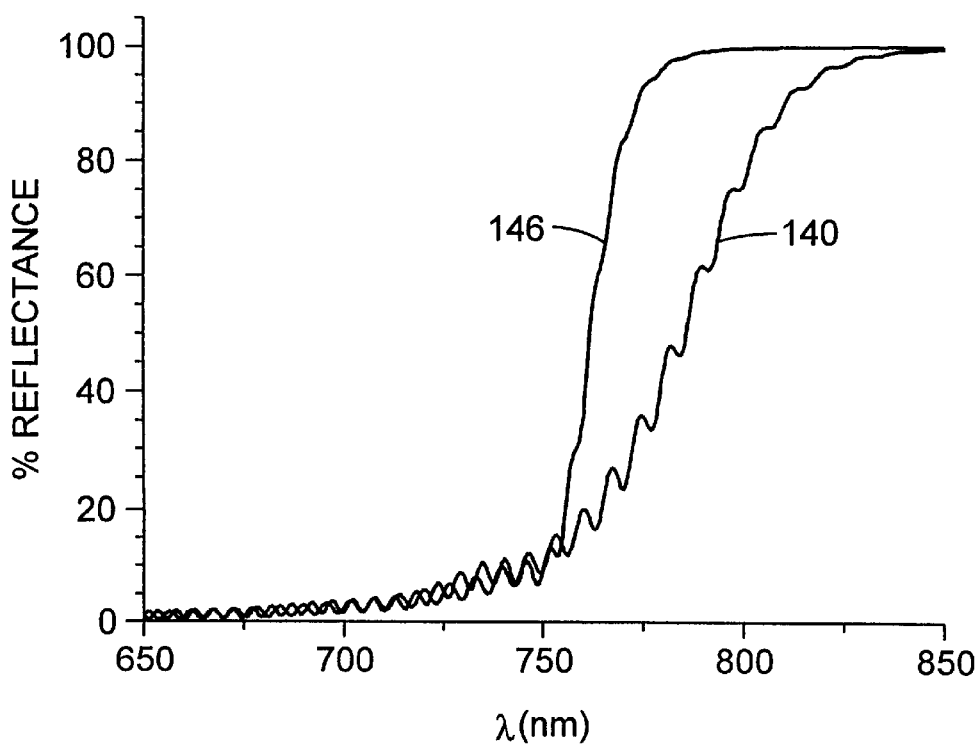
Figure 19A:
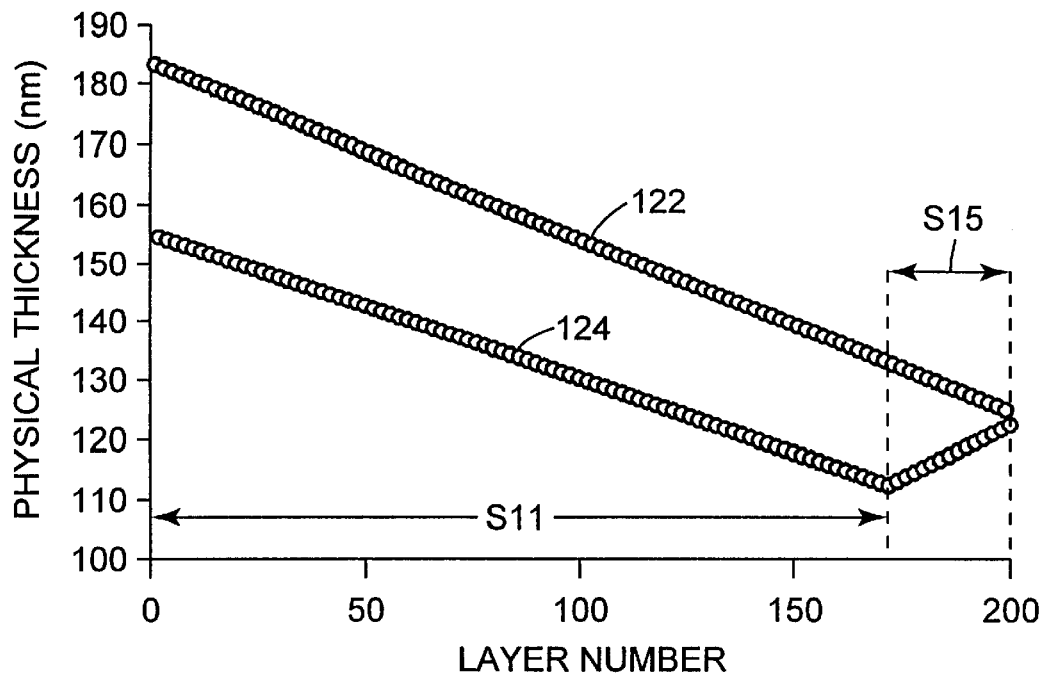
Figure 19B:
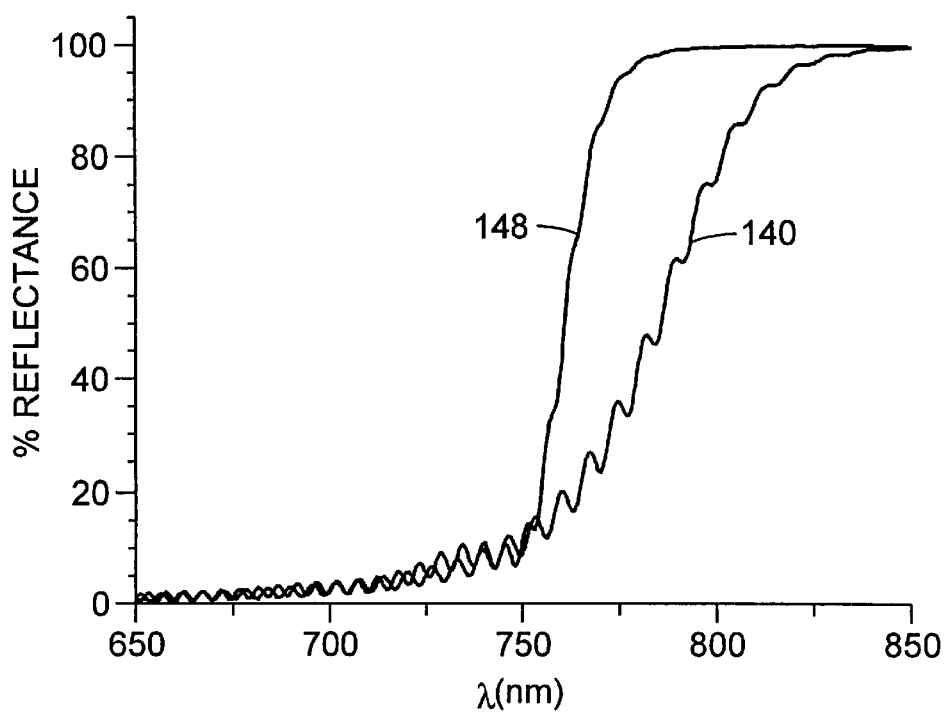

The component multilayer stack S11 serves as a baseline film design. An on-axis reflectance spectrum 140 was calculated for stack S11 alone, and then for the film combinations: S11+S12 (see FIG. 16A for physical thickness profile and FIG. 16B for reflectance curve 142); S11+S13 (see FIG. 17A for physical thickness profile and FIG. 17B for reflectance curve 144); S11+S14 (see FIG. 18A for physical thickness profile and FIG. 18B for reflectance curve 146); and S11+S15 (see FIG. 19A for physical thickness profile and FIG. 19B for reflectance curve 148). As seen from the figures, the addition to stack S11 of a stack with a reverse thickness gradient (stack S12), a stack with a reverse thickness gradient with f-ratio deviation (stack S13), a stack with a substantially zero thickness gradient (stack S14), and a stack with a reverse thickness gradient using only one component of the ORUs (stack S15) have progressively desirable effects on the sharpness of the spectral transition.

EXAMPLE ARTICLES

Example 1 Article

Alphabetical letters were written on the top (smooth) side of a cube corner retroreflective sheet using a conventional red marking pen to produce a "patterned" retroreflector. The green narrowband film of the above example was then placed on top of a sheet of hot melt adhesive (0.002 inch thick ethelyne vinyl acetate, "2 mil EVA"), which was placed on top of the patterned retroreflective sheeting. A transparent hologram sheet having hot melt adhesive on its backside was then placed on top of the green narrowband film. The sandwich of films was laminated at 300 degrees F. through a conventional desktop laminator. The resulting article looks like an ordinary aluminum back-coated hologram under ambient lighting conditions, yet is a vivid green with the alphabetical letters appearing dark under retroreflective viewing.

Example 2 Article

Blue and red letters were flexographically printed onto the top of beaded retroreflective sheeting. The beaded sheeting had a construction similar to retroreflective layer 52 (see FIG. 5) except that it had no markings 62a and overcoat layer 58 included a black opaque binder layer thick enough to hold the microspheres but thin enough that light could pass through the front side of the film through the microspheres and the spacer layer 60 to the reflective masking layer 62, and back. A multilayer polymeric optical film similar in construction to the green narrowband film of the above example but having a wider transmission band was placed on top of a sheet of 2 mil EVA hot melt adhesive which in turn was placed on the top of the beaded sheeting. A transparent hologram sheet having hot melt adhesive on its backside was then placed on top of the multilayer film. The sandwich of films was laminated at 300 degrees F. through a conventional desktop laminator. The resulting article showed the holographic image against a shiny magenta background under ambient lighting conditions, but under retroreflective viewing revealed the red and blue lettering against the green light transmitted by the multilayer film. The film appears magenta under ambient conditions because of the red and blue reflectance peaks and because the black binder layer absorbs the green light transmitted by the multilayer film.

Glossary of Certain Terms

Datum Mark: a mark (whether real or hypothetical) on a reflective article that is used as a reference to indicate orientation about the reference axis.

Entrance Angle: the angle between the illumination axis and the reference axis.

Entrance Half-Plane: a half-plane which originates on the reference axis and contains the illumination axis.

Entrance Plane: a plane containing the entrance half-plane.

F-ratio: the relative contribution of a given individual layer to the total optical thickness of a given ORU. The f-ratio for the k-th individual layer is:

$$f_k = \frac{n_k \cdot d_k}{\sum_{m=1}^{N} n_m \cdot d_m},$$

, where $1 \leq k \leq N$, where N is the number of constituent layers in the ORU, where $n_k$ ($n_m$) is the relevant refractive index of k-th (n-th) layer, and $d_k$ ($d_m$) is the physical thickness of layer k (m). The f-ratio of a layer k along a specified optical axis j is denoted $f_{jk}$ and is defined as above but where $n_k$ ($n_m$) is the refractive index of layer k (m) along axis j.

Fractional Bandwidth: the full spectral width (in units of distance such as nm) at half of the maximum height (i.e., half the amplitude) of the band divided by the center wavelength of the band (which bifurcates the full spectral width).

Illumination Axis: a line segment extending between the reference center and the source of illumination.

Light: electromagnetic radiation, whether in the visible, ultraviolet, or infrared portion of the spectrum.

Observation Angle: the angle between the illumination axis and the observation axis.

Observation Axis: a line segment extending between the reference center and a selected observation point.

Optical Repeating Unit ("ORU"): a stack of at least two individual layers which repeats across the thickness of a multilayer optical film, though corresponding repeating layers need not have the same thickness.

Optical thickness: the physical thickness of a given body times its refractive index. In general, this is a function of wavelength and polarization.

Orientation Angle: the dihedral angle between the entrance half-plane and a half-plane originating on the reference axis and containing the datum mark.

Percent reflectance: a dimensionless quantity equal to the ratio of the optical power (e.g. in milliwatts) of light that is specularly reflected from a given object divided by the optical power of light incident on the object, for a collimated incident light beam at a given wavelength. Sometimes shortened to simply "reflectance".

Percent transmission: a dimensionless quantity equal to the ratio of the optical power (e.g. in milliwatts) of light that is transmitted through a given object divided by the optical power of light incident on the object, for a collimated incident light beam at a given wavelength. Sometimes shortened to simply "transmission".

Reference Axis: a line segment extending from the reference center away from the reflective article, and which is ordinarily perpendicular to the reflective article at the reference center.

Reference Center: a point on or near a reflective article which is designated to be the center of the article for specifying its performance.

Reflectance Band: a spectral region of relatively high reflectance bounded on either side by regions of relatively low reflectance.

Skin Layer: a layer that is provided as an outer layer for a multilayer optical film, typically having a physical thickness between 10% and 20% of the sum of the physical thickness of all ORUs of such multilayer film.

Transmission Band: a spectral region of relatively high transmission bounded by spectral regions of relatively low transmission.

Visible Light: light detectable by the unaided human eye, generally in the wavelength range of about 400 to 700 nm.

All U.S. patents and patent applications referred to herein are incorporated by reference. Although the present invention has been described with reference to preferred embodiments, workers skilled in the art will recognize that changes can be made in form and detail without departing from the spirit and scope of the invention.

What is claimed is:

1. A reflective article comprising a multilayer film covering a patterned retroreflective layer, the multilayer film comprising alternating layers of at least a first and second material, the alternating layers being configured to exhibit a relatively high reflectance for normally incident light within a first spectral range and a relatively low reflectance for normally incident light within a second spectral range.

2. The article of claim 1, wherein the multilayer film is a multilayer polymeric film and wherein the first material comprises a first polymer and the second material comprises a second polymer.

3. The article of claim 2, wherein at least the first polymer layers are birefringent.

4. The article of claim 3, wherein, over a wavelength range of interest, at least two adjacent layers in the film have indices of refraction along an axis perpendicular to a plane of the film which differ by no more than 50% of the maximum in-plane refractive index difference between the two adjacent layers.

5. The article of claim 4, wherein a plurality of pairs of adjacent layers in the film have indices of refraction along the axis perpendicular to the plane of the film which differ by no more than about 20% of the maximum in-plane refractive index difference between the respective pairs of adjacent layers over the wavelength range of interest.

6. The article of claim 5, wherein substantially every pair of adjacent layers in the film has indices of refraction along the axis perpendicular to the plane of the film which are substantially the same.

7. The article of claim 3, wherein the first polymer is selected from the group consisting of: polyethylene naphthalate, and copolymers and blends thereof based upon naphthalene dicarboxylic acid; polyethylene terephthalate, and copolymers and blends thereof based upon terephthalic acid; polybutylene naphthalate, and copolymers and blends thereof based upon naphthalene dicarboxylic acid; and polybutylene terephthalate, and copolymers and blends thereof based upon terephthalic acid.

8. The article of claim 2, wherein the multilayer polymeric film comprises a plurality of polymeric layers defining optical repeating units (ORUs) with associated optical thicknesses, the ORUs arranged in a sequence of decreasing optical thickness along a given direction adjacent a sequence of non-decreasing optical thickness.

9. The article of claim 8, where the sequence of ORUs arranged in a non-decreasing optical thickness has an optical thickness profile selected from the group consisting of a flat, graded linear, and curved profile.

10. The article of claim 8, wherein the ORUs are arranged in a first and second set of ORUs each having a monotonically decreasing optical thickness profile and at least one set of ORUs having a non-decreasing optical thickness profile.

11. The article of claim 10, wherein the at least one set of ORUs has a curved optical thickness profile.

12. The article of claim 8, wherein, over a wavelength range of interest, at least two adjacent layers in the film have indices of refraction along an axis perpendicular to a plane of the film which differ by no more than 50% of the maximum in-plane refractive index difference between the two adjacent layers.

13. The article of claim 2, wherein the multilayer polymeric film has at least about 50% reflectance over at least 75% of the spectral range from 400 to 700 nanometers for normally incident light.

14. The article of claim 13, wherein the multilayer polymeric film has at least about 80% reflectance over at least 75% of the spectral range from 400 to 700 nanometers for normally incident light.

15. The article of claim 2, wherein the first spectral range includes substantially all of the spectral range from 400 to 700 nm.

16. The article of claim 2, wherein the multilayer polymeric film has a percent transmission greater than about 50% for at least some wavelengths in the second spectral range for normally incident light.

17. The article of claim 2, wherein the multilayer polymeric film has an absorption of no greater than about 1% over the first and second spectral ranges.

18. The article of claim 2, wherein the second spectral range includes at least one transmission band having a fractional bandwidth of no more than about 15%.

19. The article of claim 18, wherein the at least one transmission band has a fractional bandwidth of no more than about 5%.

20. The article of claim 18, wherein the at least one transmission band at least partially overlaps the visible spectrum.

21. The article of claim 2, wherein the patterned retroreflective layer comprises an indicia layer and a retroreflective layer.

22. The article of claim 21, wherein the indicia layer comprises portions which preferentially transmit selected wavelengths of light.

23. The article of claim 2, wherein the patterned retroreflective layer includes a structured surface having a first and second distinguishable adjacent zone defining a pattern.

24. The article of claim 23, wherein the first zone comprises retroreflective elements and the second zone is substantially unstructured.

25. The article of claim 23, wherein the first zone comprises a regular array of retroreflective elements and the second zone comprises retroreflective elements randomly tilted with respect to each other.

26. The article of claim 2, wherein the patterned retroreflective layer exhibits retroreflectance in at least one plane of incidence but not in at least one other plane of incidence.

27. The article of claim 26, wherein the patterned retroreflective layer comprises prisms extending along an axis substantially perpendicular to the at least one plane of incidence.

28. The article of claim 26, wherein the patterned retroreflective layer comprises pyramids having two distinct pairs of orthogonally-oriented opposed faces.

29. The article of claim 2, wherein the patterned retroreflective layer includes retroreflective elements having individual markings associated therewith which are detectable in retroreflected light at a selected illumination geometry.

30. The article of claim 2, wherein the patterned retroreflective layer includes beaded retroreflective sheeting.

31. The article of claim 30, wherein the beaded retroreflective sheeting includes an overcoat layer, a spacing layer, and a metallic coating.

32. The article of claim 31, wherein the overcoat layer includes an opaque binder layer.

33. The article of claim 2, further comprising a microstructured relief pattern producing a holographic image.

34. The article of claim 33, wherein the microstructured relief pattern is disposed in front of the alternating layers.

35. The article of claim 33, wherein the microstructured relief pattern is formed in a transparent layer which covers the multilayer polymeric film.

36. The article of claim 2, wherein the multilayer polymeric film is laminated to the patterned retroreflective layer.

37. The article of claim 2, wherein at least a portion of the patterned retroreflective layer is cast and cured onto the multilayer polymeric film.

* * * * *